(12) United States Patent
Mazzaro et al.

(10) Patent No.: US 10,234,543 B2
(45) Date of Patent: Mar. 19, 2019

(54) METHODS AND SYSTEMS FOR LOCATING TARGETS USING NON LINEAR RADAR WITH A MATCHED FILTER WHICH USES EXPONENTIAL VALUE OF THE TRANSMIT SIGNAL

(71) Applicant: U.S. Army Research Laboratory ATTN: RDRL-LOC-I, Adelphi, MD (US)

(72) Inventors: Gregory J. Mazzaro, Charleston, SC (US); Kyle A. Gallagher, Derwood, MD (US); Kenneth I. Ranney, Rockville, MD (US); Anthony F. Martone, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 339 days.

(21) Appl. No.: 15/133,276

(22) Filed: Apr. 20, 2016

(65) Prior Publication Data
US 2017/0307726 A1    Oct. 26, 2017

(51) Int. Cl.
| | | |
|---|---|---|
| *G01S 13/88* | (2006.01) | |
| *G01S 7/41* | (2006.01) | |
| *G01S 7/35* | (2006.01) | |
| *G01S 13/32* | (2006.01) | |
| *G01S 13/02* | (2006.01) | |

(52) U.S. Cl.
CPC .............. *G01S 7/414* (2013.01); *G01S 7/354* (2013.01); *G01S 13/32* (2013.01); *G01S 13/0209* (2013.01)

(58) Field of Classification Search
CPC .................................. G01S 7/292; G01S 7/414
USPC .......................................................... 342/193
See application file for complete search history.

(56) References Cited

U.S. PATENT DOCUMENTS

| | | | |
|---|---|---|---|
| 3,732,567 A | 5/1973 | Low et al. | |
| 3,781,879 A | 12/1973 | Staras et al. | |
| 3,972,042 A | 7/1976 | Johnson | |

(Continued)

OTHER PUBLICATIONS

Gallagher, K.A.; Mazzaro, G.J.; Ranney, K.I; Nguyen, L.H; Martone, A.F.; Sherbondy, K.D.; and Ram M. Narayanan, R.M., "Nonlinear synthetic aperture radar imaging using a harmonic radar," Proc. SPIE 9461, Radar Sensor Technology XIX; and Active and Passive Signatures VI, 946109 (May 21, 2015); doi:10.1117/12.2177219, publishing the conference proceedings of Apr. 20, 2015.

(Continued)

*Primary Examiner* — Timothy A Brainard
(74) *Attorney, Agent, or Firm* — Eric Brett Compton

(57) ABSTRACT

Embodiments of the present invention concern locating targets using non-linear radar with a matched filter which uses exponential value of the transmit signal. According to embodiments, a method of non-linear radar target location includes: transmitting a signal of a transmit waveform towards a target; receiving a signal from the target; creating a matched filter by generating an exponential function of the transmit waveform corresponding to a particular harmonic of the interest; and applying the matched filter to the received signal to generate and output a signature waveform for the target of the particular harmonic of interest. In other embodiments, the matched filtering may be combined with sidelobe reduction.

20 Claims, 25 Drawing Sheets

(56) References Cited

U.S. PATENT DOCUMENTS

| | | | |
|---|---|---|---|
| 4,053,891 A | 10/1977 | Opitz | |
| 5,191,343 A | 3/1993 | Danzer et al. | |
| 5,557,560 A * | 9/1996 | Dix | G01S 13/282 708/3 |
| 6,049,301 A | 4/2000 | Weagant | |
| 6,060,815 A | 5/2000 | Nysen | |
| 6,163,259 A | 12/2000 | Barsumian et al. | |
| 6,765,527 B2 | 7/2004 | Jablonski et al. | |
| 6,856,275 B1 | 2/2005 | Ehlers et al. | |
| 6,894,614 B2 | 5/2005 | Eckstein et al. | |
| 6,897,777 B2 | 5/2005 | Holmes et al. | |
| 7,777,671 B2 | 8/2010 | Schnitzer et al. | |
| 7,796,829 B2 | 9/2010 | Nguyen et al. | |
| 7,864,107 B1 | 1/2011 | Lehtola et al. | |
| 7,987,068 B2 | 7/2011 | Schultz et al. | |
| 8,131,239 B1 | 3/2012 | Walker et al. | |
| 8,665,132 B2 | 3/2014 | Ranney et al. | |
| 9,250,323 B2 | 2/2016 | Ranney et al. | |
| 9,451,932 B2 * | 9/2016 | Zwirn | A61B 8/4488 |
| 2010/0245152 A1 * | 9/2010 | Krikorian | G01S 7/415 342/28 |
| 2011/0291751 A1 * | 12/2011 | Park | H03H 7/0115 327/557 |
| 2015/0084811 A1 | 3/2015 | Mazzaro et al. | |
| 2015/0253415 A1 | 9/2015 | Mazzaro et al. | |

OTHER PUBLICATIONS

Gallagher, K.A.; Narayanan, R.M.; Mazzaro, G.J.; Ranney, K.I.; Marione, A.F.; and Sherbondy, K.D., "Moving target indication with non-linear radar," presented at the Radar Conference (RadarCon), 2015 IEEE, of May 10-15, 2015.

L. Nguyen, "SAR Imaging Technique for Reduction of Sidelobes and Noise," Proc. of SPIE, vol. 7308, 73080U-1-73080U-12, 2009.

U.S. Appl. No. 15/093,788, filed Apr. 8, 2016 to Gregory J. Mazzaro, et al. titled "Multitone Radar with Range Determination and Method of Use".

* cited by examiner

Convolution processing (cont'd)

Step 3 – zero pad remaining slots in both vectors

Received Signal Vector: 3, 1, 2, 1.5, 1, -1, ... 0, 0, 0, 0, 0

Empty fields in vector set to 0

Target Impulse Response Vector: 1, 2, -1, -3, -2, 1, ... 0, 0, 0, 0, 0

Empty fields in vector set to 0

Figure 6C

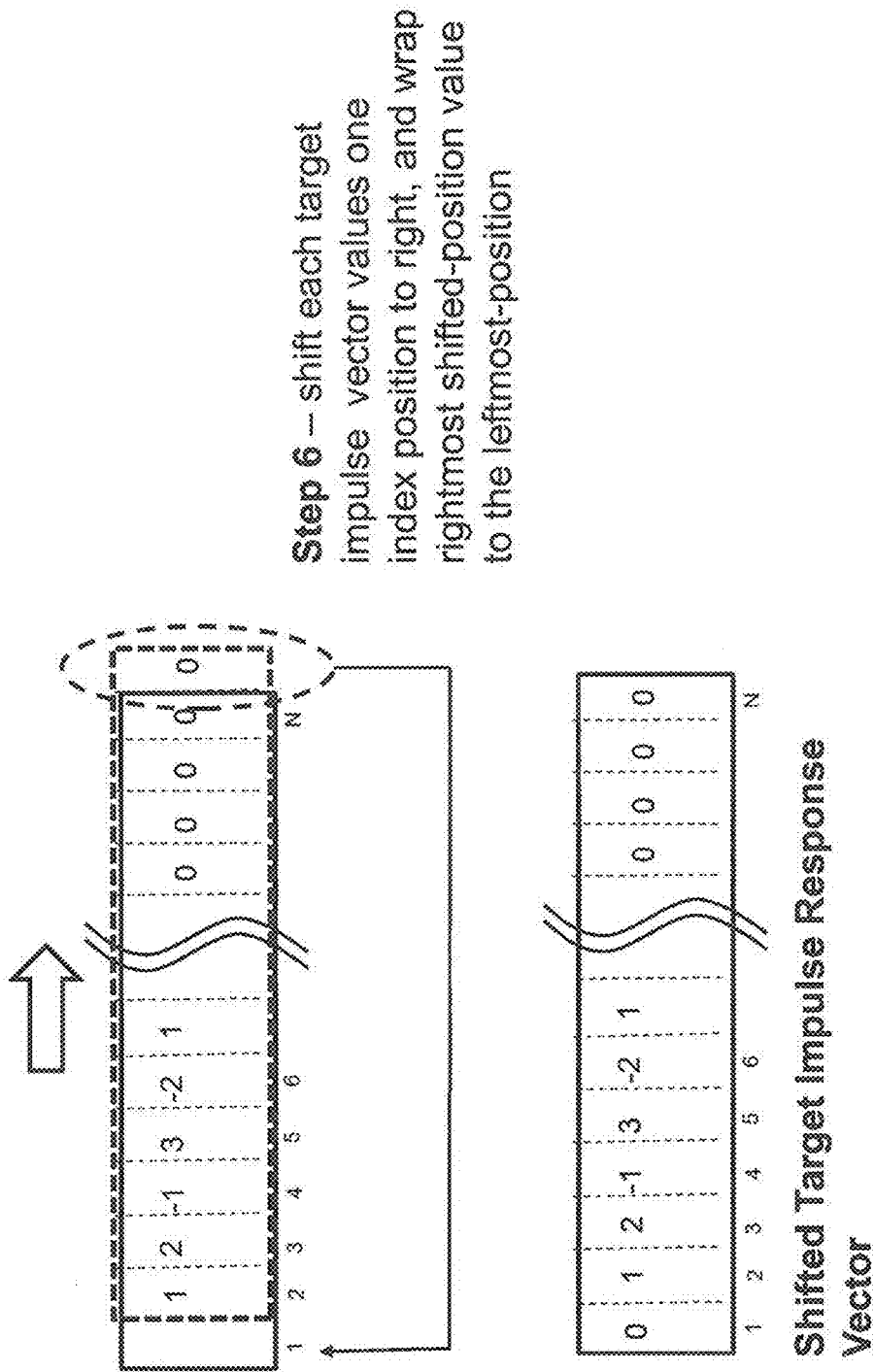

Convolution processing (cont'd)

Step 7 – repeat Steps 4-5, as needed, until the target impulse vector values have been shifted through all the index positions and compared with all of the received signal vector values, i.e.—
- the shifted target impulse vector values are multiplied with the corresponding received signal vector (in Step 4),
- the multiplied valued summed together (in Step 5), and
- the target impulse vector values shifted to the right another position (in Step 6).

Step 8 – Identify the maximum matched filter output, *output( )* value from among the values previously determined for all the iterations.

Step 9 – Repeat convolution process with new vector data:
  A new received vector will be generated for each sampling measurement of the received signal, *r(n)*. The target impulse response vector values would stay unchanged so long as using the same transmit waveform *f(n)*.

Figure 6F

Recursive Sidelobe Minimization (RSM) processing

Step 1 – Initialize values of function for the final high range resolution (hrr) signature produced by the iterative RSM processing, $f_{RSM}(n)$.

Step 2 – Set variables for iterative sidelobe reduction processing:

- $R$, the number of cells to randomly excise during recursive sidelobe minimization;
- $P$, the number of recursive sidelobe minimization iterations; and
- $B$, the band of frequencies considered for matched filtering.

Step 3 – Transform functions to frequency domain processing, i.e.,—

- measured received signal, $r(n) \rightarrow R(m)$; and
- the matched filter, $f_m(n) \rightarrow F(m)$

Figure 9A

RSM processing (cont'd)

Step 4 – Repeat the following RSM steps, P times:

- Step 5 – Randomly excise R frequencies samples from within frequency band B;
- Step 6 – Reduce sidelobe levels by a windowing operation;
- Step 7 – Computed ranging distance intensities $f_{out}(n)$, where $f_{out}(n) = IFFT\{F_{out}(m)\}$;
- Step 8 – Compare the previous value for the ranging distance intensity and current values for each cell and select the smaller value.

Step 9 – Output the high-resolution range profile (with reduced sidelobe levels), $f_{RSM}(n)$

Figure 9B

METHODS AND SYSTEMS FOR LOCATING TARGETS USING NON LINEAR RADAR WITH A MATCHED FILTER WHICH USES EXPONENTIAL VALUE OF THE TRANSMIT SIGNAL

GOVERNMENT INTEREST

Governmental Interest—The invention described herein may be manufactured, used and licensed by or for the U.S. Government.

REFERENCE TO COMPUTER PROGRAM LISTING APPENDIX

A computer program listing appendix has been submitted via EFS-Web labeled as "codeappendix." The material contained in the appendix is incorporated by reference herein as though rewritten fully herein.

BACKGROUND OF THE INVENTION i) Field of Invention

This application generally relates to radar, and more particularly, to non-linear radar and processing steps, which exploit non-linear target responses.

ii) Description of Related Art

Historically, radar systems have operated on signals that are assumed to be echoes produced by linear systems. In linear radar systems, a pulse transmitted at one frequency will reflect off an object and produce a receive signal at the same frequency. This paradigm generally functions well, enabling radar systems to detect targets provided that their signatures are sufficiently different from those of natural clutter objects. Unfortunately, it has been demonstrated that certain clutter objects produce large linear responses to radar probe signals. For example, trees and rocks are capable reflecting relatively large amounts of energy, making it difficult for radar operators to distinguish them from targets of interest.

Advances in radar technology have made the problem somewhat more tractable. Modern synthetic aperture radar (SAR) systems are capable of achieving high resolution in both downrange and cross-range. While these systems produce detailed imagery of a scene, the detection of smaller targets can still be problematic. For example, targets that are only a few inches in diameter may produce a radar signature that is indistinguishable from the clutter background. Modern systems that exploit Doppler phenomena face a similar problem. In this case, large returns from stationary clutter objects can obscure slow-moving targets and, especially, if the targets reflect only a small amount of energy relative to the nearby clutter. It is the width of the main clutter lobe that helps fix the minimum detectable velocity achieved by a moving target indication (MTI) system.

Improvements in non-linear radar would be useful.

BRIEF SUMMARY OF THE INVENTION

Embodiments of the present invention concern methods and systems for locating targets using non-linear radar with a matched filter which uses exponential value of the transmit signal.

According to embodiments, a method of non-linear radar target location comprises: transmitting, with an transmitting antenna, a signal of a transmit waveform towards a target; receiving, with a receiving antenna, a signal from the target; and by way of at least one processor: creating a matched filter by generating an exponential function of the transmit waveform corresponding to a particular harmonic of the interest; and applying the matched filter to the received signal to generate and output a signature waveform for the target of the particular harmonic of interest.

Before the step of creating the matched filter, the method may further comprise analyzing the transform waveform to determine if it is real or complex; and calculating an analytic signal version of the transmit waveform for subsequent use as the transmit waveform, if the transmit waveform is determined to be real. Calculating the analytic signal version of the transmit waveform may be achieved by applying a Hilbert transform to the transmit waveform, for instance.

The particular harmonic of the interest can be characterized as $n*f_1$, where $n \geq 2$ and $f_1$ is the fundamental frequency of the transmit waveform and the exponential function may be defined as $f^n$ (n). Thus, in some instances, the harmonic of interest is a second harmonic and the exponential function is the square of the transmit waveform. Or the harmonic of interest is a third harmonic and the exponential function is the cube of the transmit waveform. Higher harmonics are also envisioned.

In general, the exponential function is assumed to be an expected target response signature such that the output of the matched filter is a correlation between the received signal and the expected target response signature. The transmit waveform may be any waveform suitable for radar applications, such as, a chirp waveform, pseudorandom noise waveform, polyphase code waveform, Frank code waveform, Barker code waveform, or pseudorandom code waveform.

To apply the matched filter to the received signal, the methodology can include: sampling the received signal over a period of time; time-reversing the exponential function generally corresponding to the same period of time; and comparing the sampled received signal and time-reversed the exponential function via a convolution process to determine the time delay or phase shift between the two signals.

The convolution process may comprise populating a received signal vector with sampled signal data of the received signal, and a target impulse response vector with signal data corresponding to the exponential function. If there are any unpopulated data fields in the received signal or the target impulse response vectors, zero values may be added in their place. The convolution process may be thought of as an iterative process, in which each iteration involves: multiplying corresponding vector index values of the received signal and the target impulse response vectors together; summing the multiplied values; shifting the target impulse vector values one index position to the right; and wrapping rightmost shifted-position value to the leftmost-position in the vector. After completing all iterations, the maximum summed value for all the iterations is identified. A new received vector is generated for a new sampling of the received signal, and the target impulse response vector values stay unchanged so long as the same transmit waveform is used. A complex conjugate function may be used to execute these steps, for example.

In further processing, in some embodiments, sidelobe reduction is applied in combination with the matched filtering. The combined sidelobe reduction and matched filtering can include: filtering the received signal with the matched filter; and performing a recursive sidelobe minimization process (RSM) in a plurality of iterations, wherein each iteration of the RSM process comprises: randomly excising a sub-set of frequency samples from within a frequency band of the matched filtered received signal; and reducing sidelobe levels of said signal by a windowing operation. The received signal and the matched filter could be both transformed into the frequency domain prior to the filtering operation for simplified processing compared to in the time domain. The windowing operation might include a Hanning window, a Taylor window, or a rectangular window, for instance.

According other embodiments, a system for non-linear radar target location includes: a transmitter having an antenna which is configured to transmit a signal of a transmit waveform towards a target; a receiver having an antenna which is configured to receive a signal from the target; and at least one processor which is configured to: create a matched filter by generating an exponential function of the transmit waveform corresponding to a particular harmonic of the interest; and apply the matched filter to the received signal to generate and output a signature waveform for the target of the particular harmonic of interest. The transmitter includes a wave generator for generating to transmit waveform.

According to further embodiments, a method of non-linear radar target location includes: transmitting, with an transmitting antenna, a signal of a transmit waveform towards a target; receiving, with a receiving antenna, a signal from the target; and by way of at least one processor: analyzing the transform waveform to determine if it is real or complex; and calculating an analytic signal version of the transmit waveform for subsequent use as the transmit waveform, if the transmit waveform is determined to be real; creating a matched filter by generating an exponential function of the transmit waveform corresponding to a particular harmonic of the interest; filtering the received signal with the matched filter signal; performing a recursive sidelobe minimization process (RSM) in a plurality of iterations, wherein each iteration of the RSM process comprises: randomly excising a sub-set of frequency samples from within a frequency band of the matched filtered received signal; and reducing sidelobe levels of the matched filtered received signal by a windowing operation.

These and other embodiments are further discussed below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only a few embodiments of this invention and are therefore not to be considered limiting of its scope, for the invention may admit to other equally effective embodiments. These embodiments are intended to be included within the following description and protected by the accompanying claims.

FIG. 3A shows a simple cosine function as an exemplary fundamental signal. FIG. 3B shows the squared cosine function the second harmonic function. FIG. 3C shows the cubed cosine function and the third harmonic function. FIG. 3D shows the fourth power cosine function and the fourth harmonic function;

FIGS. 6A-I show the convolution processing which may be employed by the matched filter according to embodiments of the present invention;

FIGS. 9A-E show a recursive sidelobe minimization (RSM) for the sidelobe reduction that is used in conjunction with the matched filter according to embodiments of the invention; FIG. 10A shows the target signature enhancement realized by incorporation of RSM into the HRR profile calculation. And FIG. 10B show the target response for ranges between 0 to 50 feet, in greater detail.

DETAILED DESCRIPTION OF THE INVENTION

Embodiments of the present invention provide improved non-linear detection and ranging capabilities. It has been demonstrated that certain objects produce non-linear responses to radar probe signals. Nonlinear radar produces frequencies in a nonlinear target (e.g., electronics or metal object) response that are different from those transmitted by the radar, thereby separating natural clutter from the non-linear target response. In particular, echoes can be observed at one or more harmonics of the transmitted frequencies. Thus, the processing described herein does not focus on the entire transmit waveform, which contains multiple discrete signal tones, but instead it focuses on its harmonic(s)-of-interest.

Figure 1:
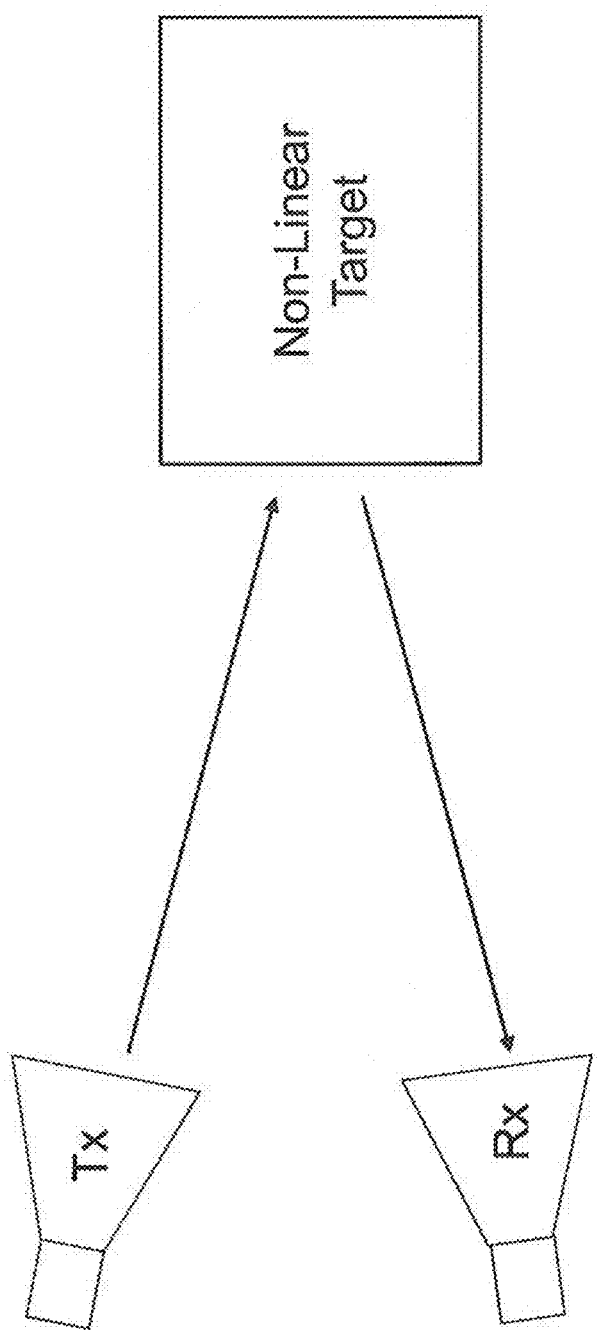
FIG. 1 shows a simple schematic of a non-linear radar scenario which embodiments of the present invention are directed.

The novel methodology detects and processes harmonic target responses to a transmitted radar waveform, and in this way, it is able to localize the target in range. FIG. 1 shows a simple schematic of a non-linear radar scenario. A radar transmitter Tx emits a radar signal toward the non-linear target. The transmitted signal interacts with the target and reflects a signal which is received by a radar receiver Rx. The transmit signal may be any radio signal used for radar communication.

The transmit waveform or waveforms should be well-understood. Typical, such signals are periodic function. That is: If the frequency-domain representation of the transmitted signal during a time interval $t_i$ is: then the target response (i.e. the time series) will be: $\Sigma_n \, a_{n,i} \cos(\omega t + \phi_i)^n$, where i denotes time intervals (which are disjoint), n is the power series index, and $a_{n,i}$ is the power series coefficient. Preferably, a $2^{nd}$ harmonic target response is used as that signal is typically the strongest harmonic. Of course, higher harmonics (e.g, $3^{rd}$, $4^{th}$, $5^{th}$ ... $n^{th}$) may also be considered. This follows from the fact that the non-linear response can be represented as a power series, and different terms in the series produce different harmonics.

Figure 2:
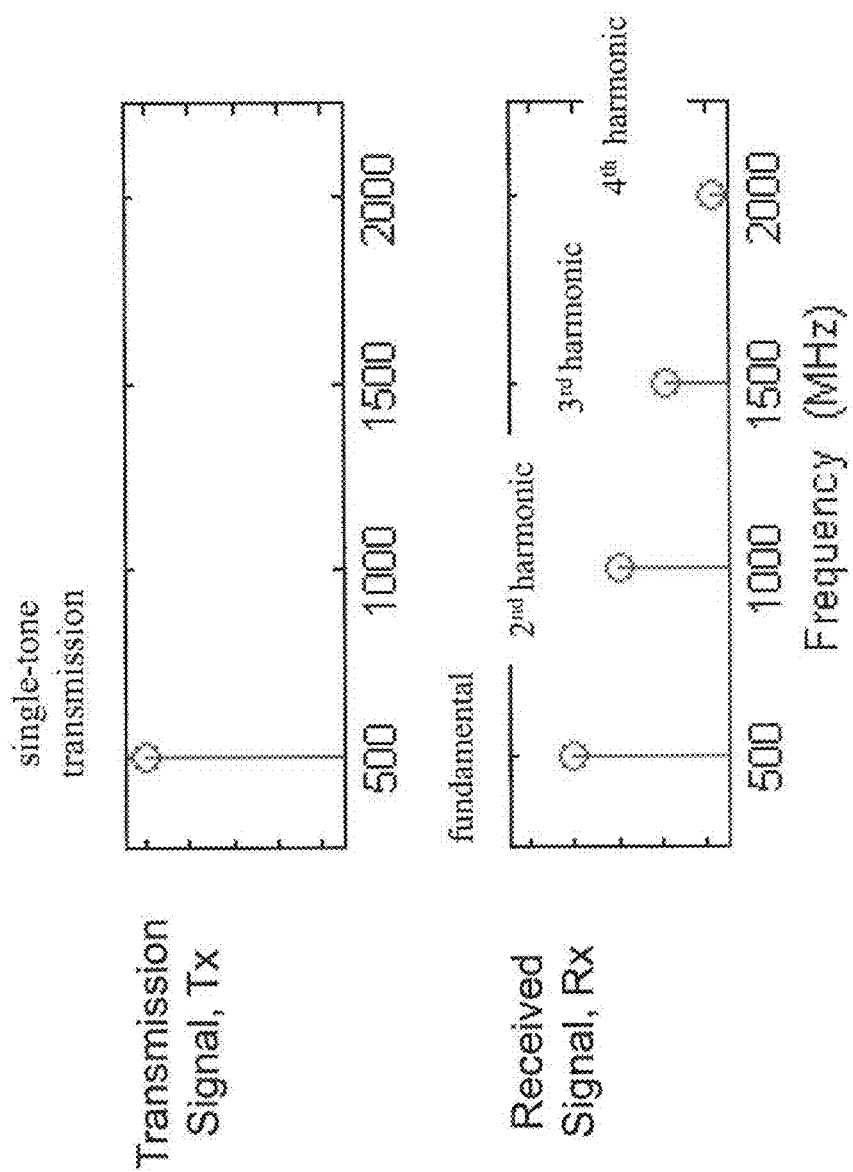
FIG. 2 shows an example of an ideal transmit signal and received signal in a non-linear radar scenario in the frequency domain.

FIG. 2 shows an example of an ideal transmit signal and received signal in a non-linear radar scenario in the frequency domain. The transmit signal here is a signal tone transmission at 500 MHz. Harmonic signals are multiples of the fundamental (first order) frequency. The non-linear received signal is believed to include various signals including the fundamental (500 MHz), second harmonic (1000 MHz), third harmonic (1500 MHz), fourth harmonic (2000 MHz), etc. The problem is that the various harmonics are received (nearly) simultaneously. Also, they may have different time delays or phase shift. This make individual detection of a particular harmonic of interest in the received signal difficult. Signal clutter can further exacerbate the situation.

To isolate and detect a particular non-linear harmonic of interest, a matched filter is utilized which uses an exponential function of the transmit waveform signal. The exponential is whole number greater than or equal to 2. This corresponds to the square, cube, quadric, etc. The matched filter correlates a parameter of a known signal with an unknown signal to detect the presence of the parameter in the unknown signal. In this case, the parameter of interest is frequency or period associated with a particular harmonic. It turns out the overall frequency of the exponential functions are the same as their corresponding harmonics. This matched filter is then used to enable and/or improve detection of targets which are expected to generate a response at this specific harmonic. The matched filter attempts to match the received signal to an expected version of the target response for a particular harmonic, based on the corresponding exponential of the transmit signal. Advantageously, by using this methodology, the fundamental frequency of the transmit signal, which the harmonic frequencies are multiples of, does not need to be known or calculated.

Figure 3A:
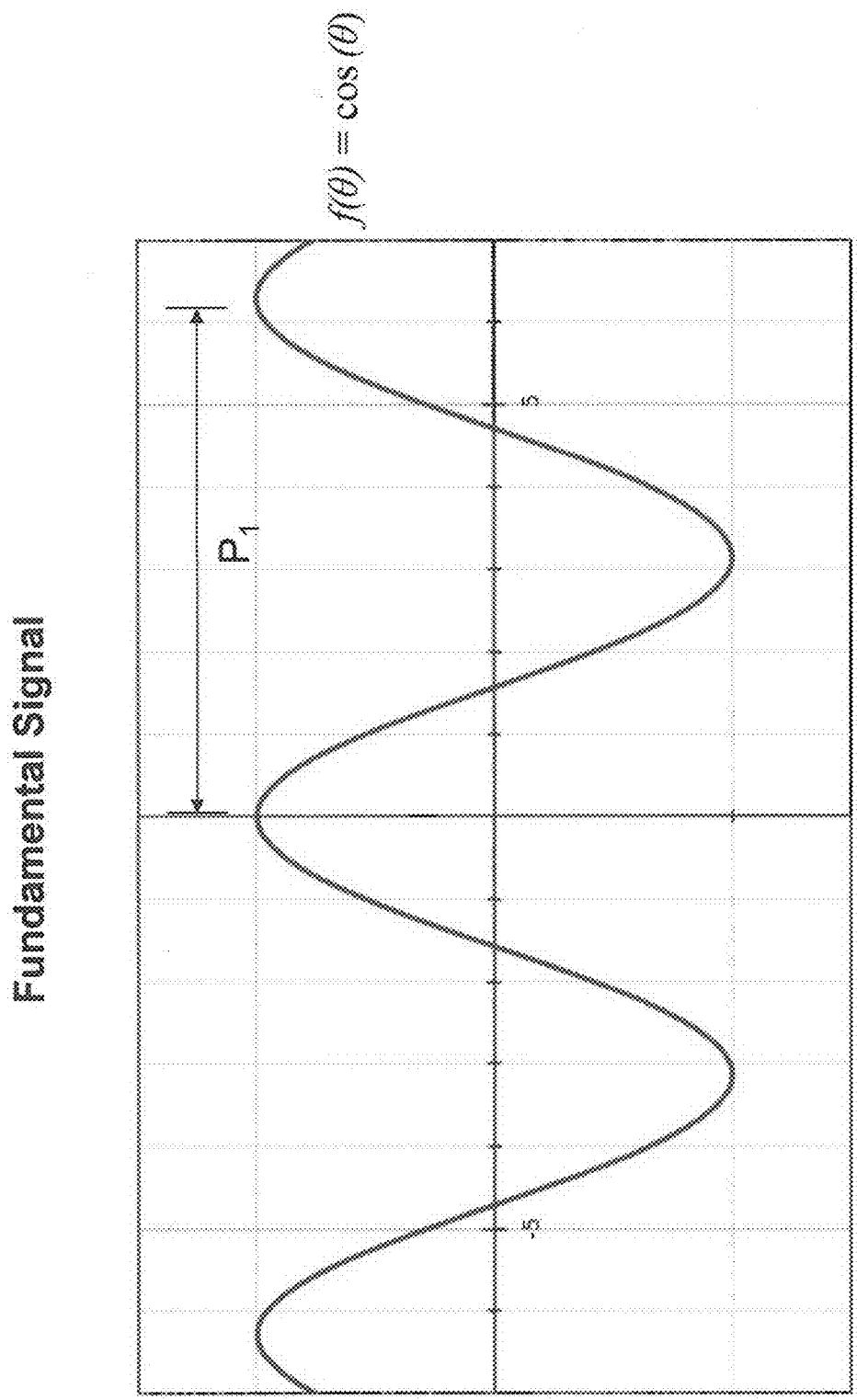
FIG. 3A-D show examples of how the non-linear target response can be represented by exponentials of the transmit waveform and their corresponding harmonics.

FIGS. 3A-D show some examples of how the non-linear target response can be represented by an exponentials of the transmit waveform and their corresponding harmonics. A cosine function $\cos(\theta)$ is considered as a transmit signal for ease of explanation as shown in FIG. 3A. This is also considered the fundamental signal. It has a period $P_1$ of $2\pi$ (~6.28) radians and arbitrary frequency $f_1$ of 1 (where $f=2\pi/P$). The exponential function of the power series term in the non-linear target response here is $\cos^n(\theta_1)$, where n is a whole number greater than or equal to 2.

Figure 3B:
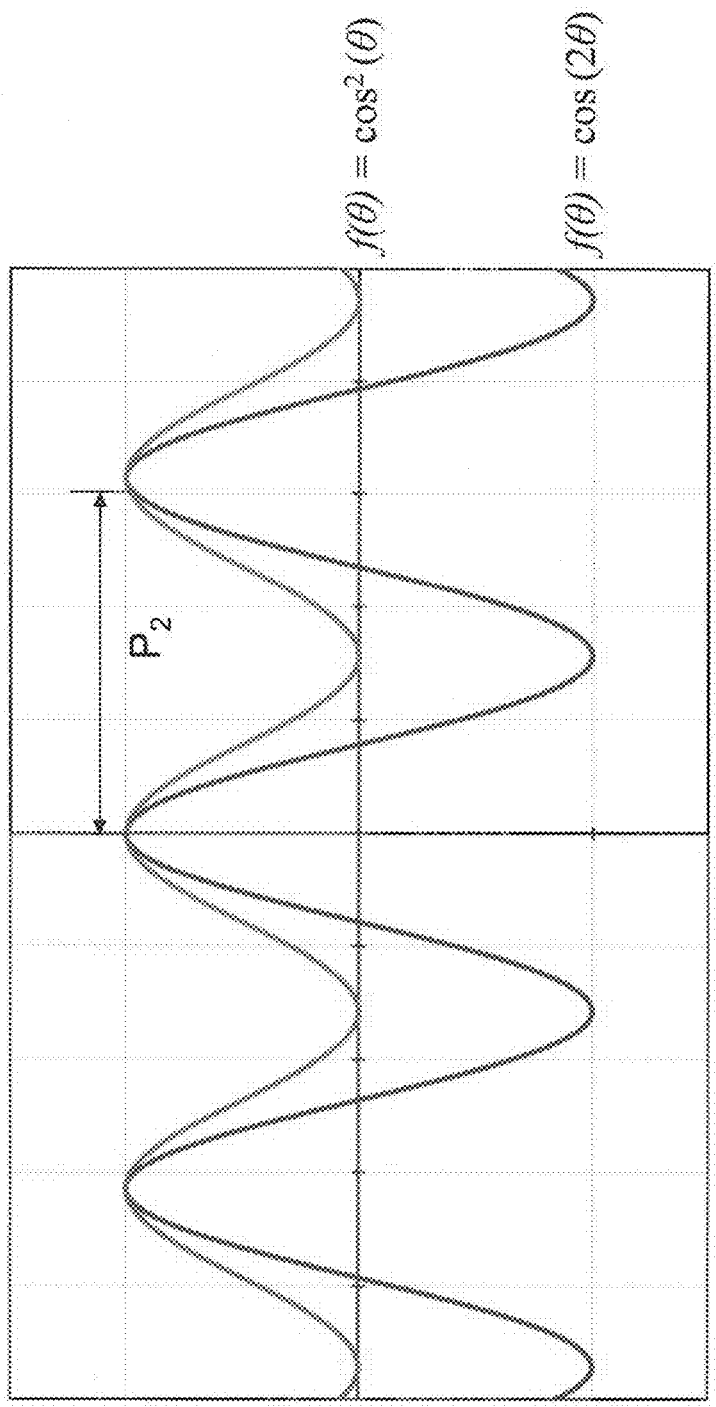

For the power series product term squared (n=2), $\cos^2(\theta_1)$ is equal to $\frac{1}{2}+\frac{1}{2}\cos(2\theta_i)$, where $\theta_i=\omega_i t+\phi_i$. This can be mathematical shown by way of a trigonometric identity. The first component here is a DC component, whereas the second component is a cosine function of double the fundamental frequency. When summed this second component dictates the frequency of the squared function. FIG. 3B shows the squared function $\cos^2(\theta)$ and the second harmonic function $\cos(2\theta)$. As apparent, the squared function has the same period and frequency as the second harmonic function. The period $P_2$ for both functions is $\pi$ pi (~3.14) radians which is half that of the fundamental signal $P_1$. And their frequency $f_2$ is twice that of the fundamental signal's frequency $f_1$. Hence, we have a second-order harmonic signal in the squared function.

Figure 3C:
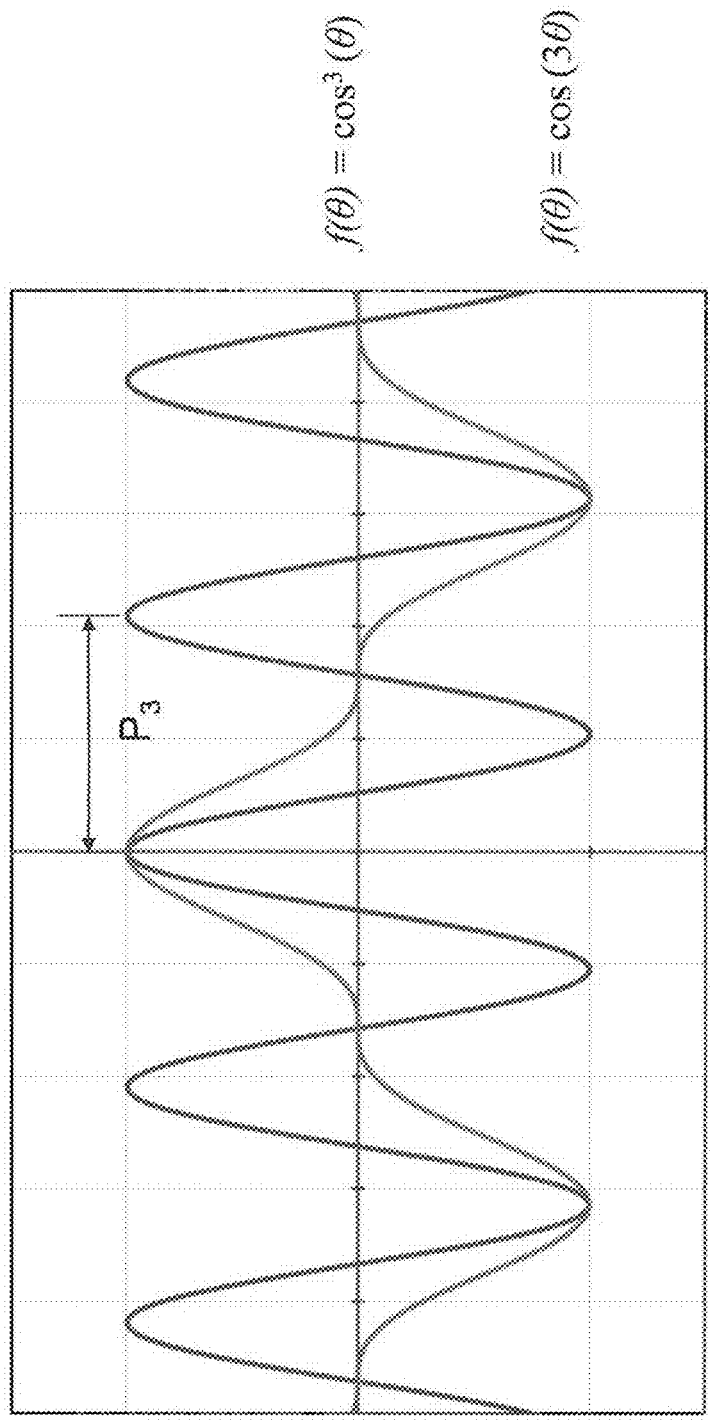

Similarly, for the power series product term cubed (n=3), $\cos^3(\theta_i)$ is equal to $\frac{3}{4}\cos(\theta_i)+\frac{1}{4}\cos(3\theta_i)$. The first component here corresponds to the fundamental frequency, whereas the second component is a cosine function of triple the fundamental frequency. When summed this second component dictates the overall frequency of the cubic function. FIG. 3C shows cubed function $\cos^3(\theta)$ and the third harmonic function $\cos(3\theta)$. As apparent, the cubed function has the same period and frequency as the third harmonic function. The period $P_3$ for both functions is $2\pi/3$ (~2.09) radians which is a third that of the fundamental signal $P_1$. And their frequency $f_3$ is triple that of the fundamental signal's frequency $f_1$. Thus, we have a third-order harmonic signal in the cubed function.

Figure 3D:
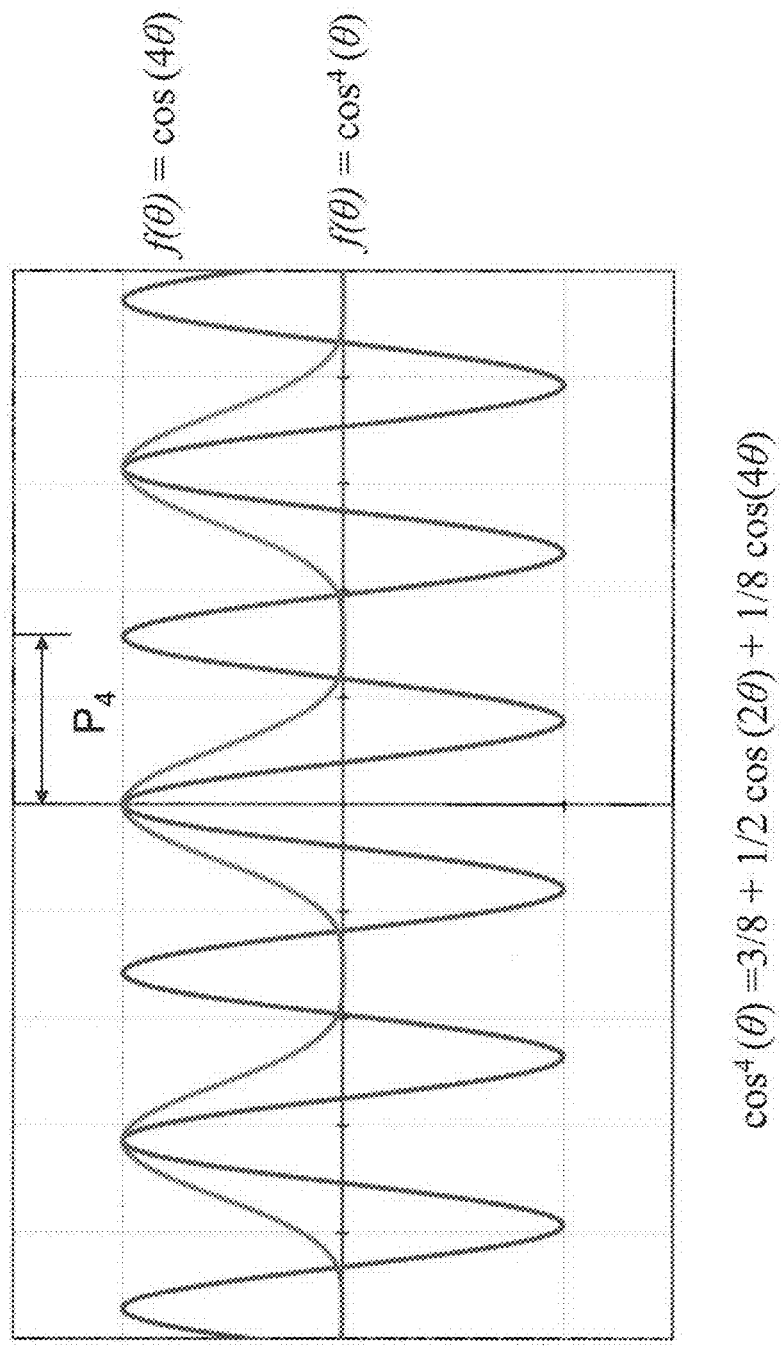

And, for the power series product term to the fourth power (n=4), $\cos^4(\theta_i)$ is equal to $\frac{3}{8}+\frac{1}{2}\cos(2\theta_i)+\frac{1}{8}\cos(4\theta_i)$. The first component here is a DC component, the second term is a cosine function of double the fundamental frequency and the third component is a cosine component of quadruple frequency. When summed, this third component dictates the overall frequency of the fourth power function. FIG. 3D shows fourth power function $\cos^4(\theta)$ and the fourth harmonic function $\cos(4\theta)$. As apparent, the fourth power function has the same period and frequency as the fourth harmonic function. The period $P_4$ for both functions is $\frac{1}{2}\pi$ (~1.57) radians which is a fourth that of the fundamental signal $P_1$. And their frequency $f_4$ is four times that of the fundamental signal's frequency $f_1$. Here, we have a fourth-order harmonic signal in the fourth power function.

From the general pattern apparent here from the second to fourth harmonics, it should be becoming clear that there is harmonic component corresponding to the power of the function which dictates the overall frequency of the exponential function. Higher power of cosines can be deduced using De Moivre's formula, Euler's formula, binomial theorem, and/or other trigonometric identities. While the exponential may, in theory, be any whole number greater than or equal to 2, in actuality, the exponential of preferred embodiments is 2 or 3 and maybe 4. That is because beyond about the third or fourth power, the signal to noise ratio (SNR) may become too small to isolate the corresponding harmonic signal which becomes exponential smaller for each increasing power ($\frac{1}{2}$ times for n=2, $\frac{1}{4}$ times for n=3 and $\frac{1}{8}$ times for n=4, etc.). Although a cosine function was described for explanation purposes above, it is believed that this phenomenon occurs with any periodic or repeating function, which may be characterized as combinations of sine and/or cosine functions, as in a Fourier series.

The matched filter exploits this mathematical phenomenon, by restricting attention of the received signal to the frequency of the exponential power of the transmitted signal. As shown above, this corresponds to a particular non-linear harmonic frequency. So if we are interested in examining the second harmonic, we would use the frequency of the square of the transmitted signal for locating a second harmonic signal in the received signal data. And if we are interested in examining the third harmonic, we would use the frequency of the cube of the analytic form of the transmitted signal for locating a third harmonic signal in the received signal data, and so forth, using higher powered exponents for the higher corresponding harmonics.

By using the matched filter with an exponential function, we have more flexibility in the selection of our transmitted waveform. For instance, by using an analytic (i.e., a complex, Hilbert-transformed) version of the signal, we eliminate the DC component in the squared version and effectively limit our consideration to the second-order response. This is emphasized by the plot of FIG. 7, discussed below, showing the squared response in the frequency domain together with the received target response (also in the frequency domain). On the other hand, if an analytic (complex) signal of the transmit waveform is used instead it would have complex numbers and the conjugation operation will have an effect.

Figure 4:
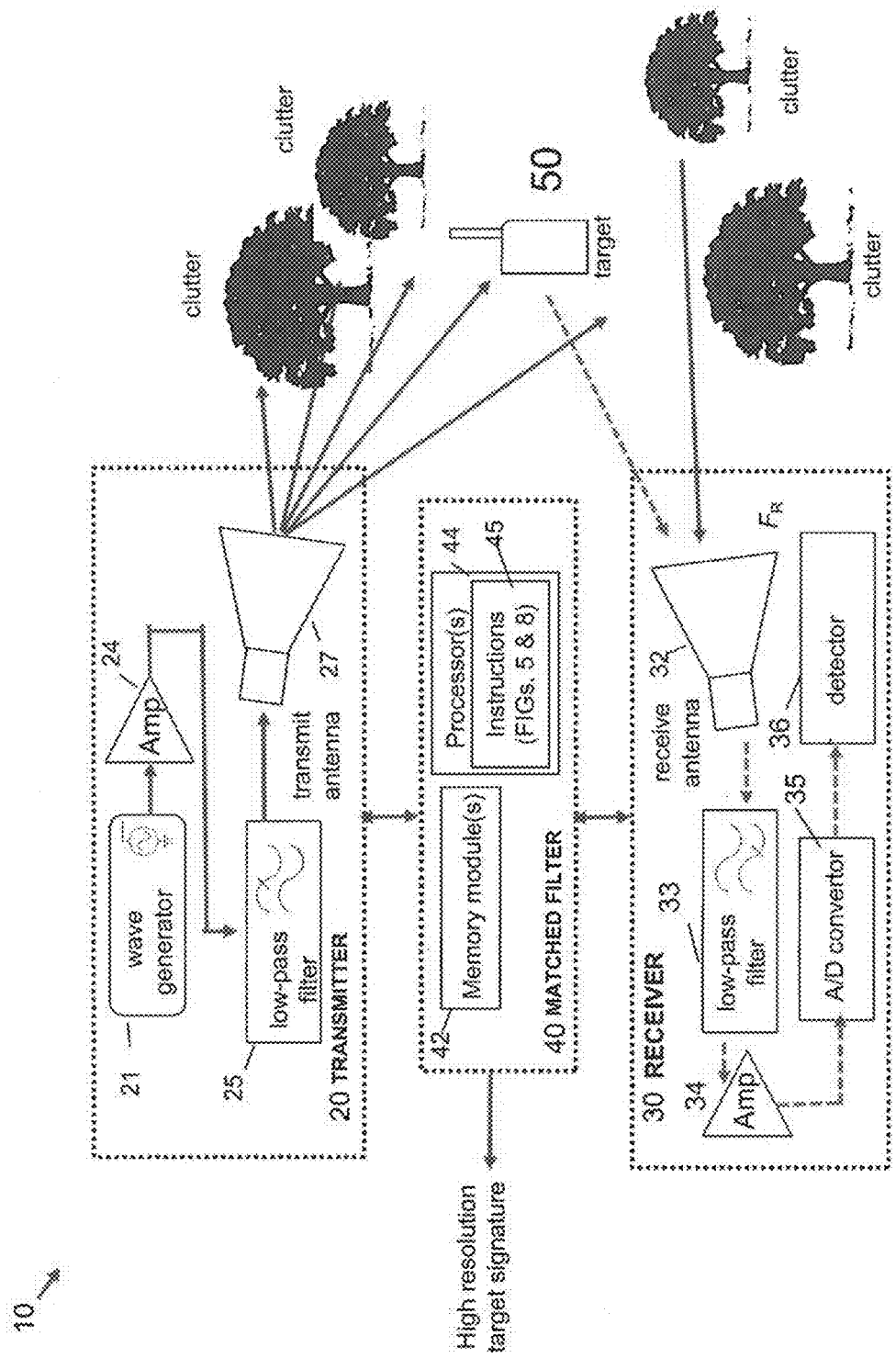
FIG. 4 shows a block diagramming of a non-linear radar system incorporating a matched filter according to embodiments of the present invention.

FIG. 4 shows a block diagramming of a non-linear radar system 10 incorporating a matched filter according to embodiments of the invention. In this diagram, the transmitter is 20 and the receiver is 30. These may be formed of conventional radar elements.

As explained herein, a novel matched filter 40 is connected to the transmitter 20 and the receiver 30. While shown adjacent to the transmitter 20 and receiver 30, it will be appreciated that the matched filter 40 could be located remotely from one or both of these elements. In other instance, it could be incorporated therein. The non-linear radar system 10 can be mounted on an aircraft or a vehicle configured with transmitting and receiving antennas to transmit and measure the reflected radar signals from a target 50 of interest.

The radar system 10 may configured to transmit and receive in the 300 MHz to 3 GHz range, for instance. Since the target responses are assumed to be non-linear, the methodology concentrates on the second and higher harmonics of the transmitted frequencies. The highest target returns are typically found at the second harmonics which are likely of primary interest. While one could use the third, fourth, or even higher harmonics, there may be lower efficiencies in terms of the received signal strength. It has been found that some targets (theoretically) generate only odd harmonics. This may be the result of metal-to-metal junctions, for example; so in these case, the odd harmonics would be of primary interest. Other physical phenomena and target interaction may produce other responses. The selected set of harmonics/intermodulation (intermod) products selected should be contiguous. Gaps in the spectrum of the received signal are to be avoided, since they introduce sidelobe artifacts.

In the transmitter 20, a transmit waveform signal is created by a waveform generator 21 which could be any conventional signal generator suitable for radar. The transmit waveform may be a periodic function of a single frequency tone f. Integer multiples of the original frequency (e.g. 2f, 3f 4f . . . ) are harmonics. The time domain representation of the transmitted waveform is denoted $f(t)$ in the continuous time domain or $f(n)$ in the discrete time domain. As most radar systems are digitally implemented, attention will primarily be paid to the discrete time domain. An amplifier 24 boots the transmit signal strength as would be suitable for the radar application. If desired, a filter, such as a low-pass filter 25 may be used to eliminate high frequencies and/or noise generated during amplification from the signal prior to transmission. The amplified signal is transmitted by the transmit antenna 27.

Radar systems process linear data produced by both the target 50 and natural clutter echoes. Certain targets of interest, however, produce non-linear responses, while clutter objects do not. The target 50 may be an electronic device, such as a cellular phone as shown. Additional targets might include the metal-to-metal junctions on certain man-made objects, indicating the presence man-made devices; for example, metallic unexploded ordnance or tightly-packed, small metallic objects.

According to the novel non-linear processing, by considering second or higher harmonic responses to our transmitted waveform, the processing is able to eliminate the often large responses due to natural clutter, such as trees and foliage. More particularly, by creating a matched filter 40 from exponentials of the transmitted signal, this non-linear processing technique can adapt and extend the concepts of linear systems.

The backscattered radar signals from the target 50 or other imaging area along the radar path captured by the receiver 30. For instance, in the receiver 30, signals are received by a receiving antenna 32. The received signal is then passed through a low-pass filter 33 to eliminate higher-frequency data that is not of interest. It is then amplified and digitized, via amplifier 34 and digitizer 35, respectively, before being input to the detector 36, which performs any preliminary processing prior to the matched filter. Thus, a digitized, time-domain signal for the received signal may be input to the matched filter 40.

The matched filter 40 is configured to generate and output a signature waveform for the target signature of the desired harmonic. Ideally, a high-resolution target signature. It may be implemented as machine-executable or computer-executable-instruction (e.g., software code) executed by a computer processing module, which is comprised of memory module(s) 42 and one or more processor(s) 44 (or microprocessors) as known in the art that are configurable to execute the novel processing methodology. Instructions 45, such as software code, firmware, or the like, may be stored on a computer or machine-readable storage media having computer or machine-executable instructions executable by the processor(s) 44 configured them for executing of the processor(s). Processor-executable instructions 45 can be stored in a non-volatile memory device and executed by the processor(s) when needed. (FIGS. 5 and 8 further detail matched filter processing and combination matched filter processing with sidelobe reduction processing which the processor-executable instructions 45 may implement. The specifics of this processing is discussed below.).

In some implementations, the processor(s) 44 may be a programmable processor, such as, for example, a field-programmable gate array (FPGA) or an application-specific integrated circuit (ASIC) processor. The methodology disclosed herein may be implemented and executed by an application that may be created using any number of programming languages. An embodiment of invention has been verified using measured data and Mathworks® Matlab code. A copy of the Matlab code is incorporated by reference in the attached Appendix. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting. The methodology disclosed herein may be implemented and executed by an application may be created using any number of programming languages.

Alternatively, embodiments of the matched filtering could be implemented as hardware (e.g., electrical circuit) using delay lines, stored replicas of the waveform (e.g. an arbitrary waveform generator), etc. The key point of this disclosure, however, is the processing methodology. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

Figure 5:
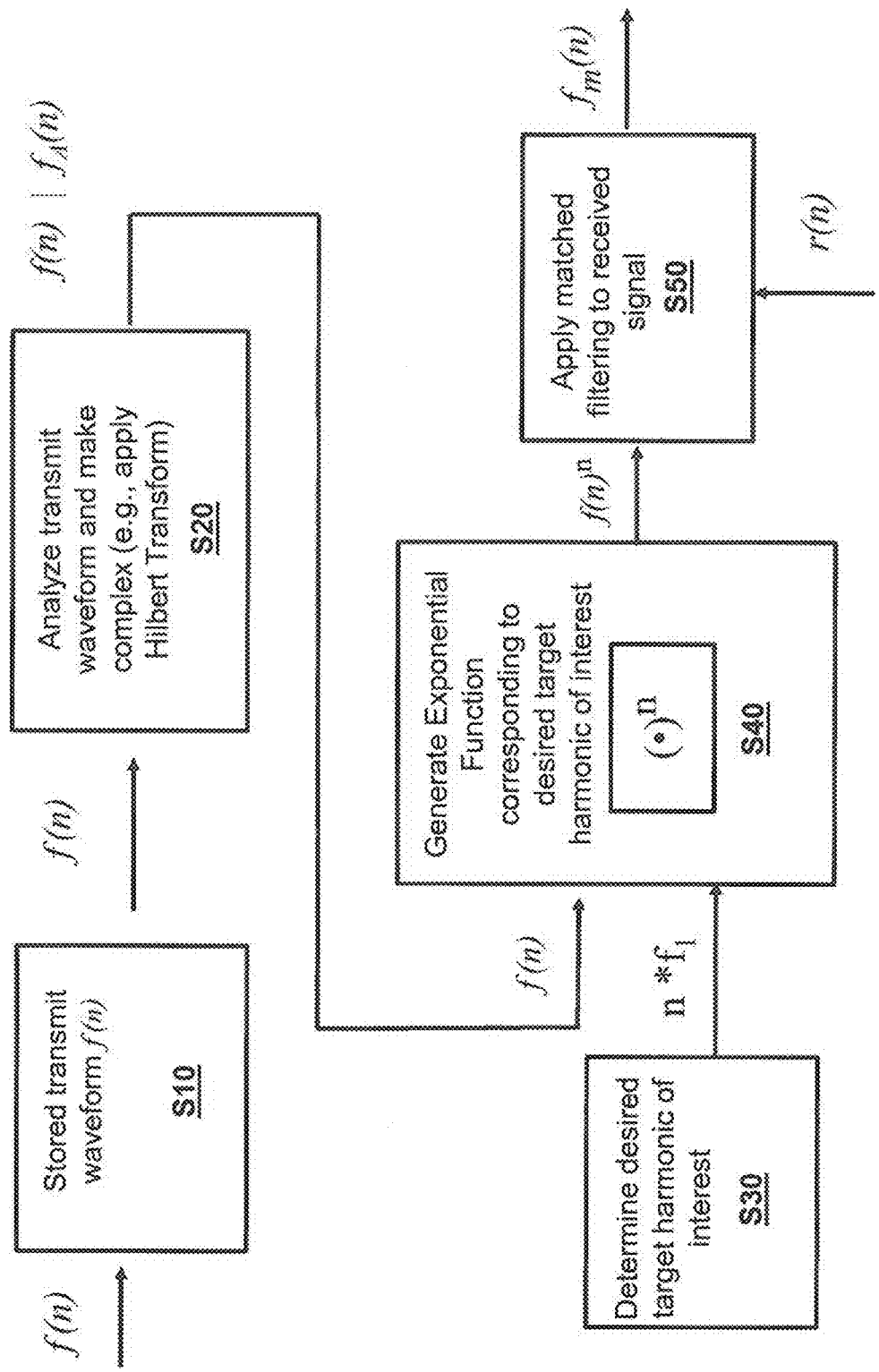
FIG. 5 shows a flow chart diagramming the matched filter processing used by the matched filter in a non-linear radar system or other applications in accordance with embodiments of the present invention.

FIG. 5 shows a flow chart diagramming the matched filter processing used by the matched filter 40 in a non-linear radar system 10 or other applications in accordance with embodiments of the invention.

Immediately prior to or during transmission, a copy of the transmit waveform $f(n)$ is provided to the matched filter 40 from the antenna receiver 20; it may be generated by the waveform generator 21. The transmitted waveform $f(n)$ may be any waveform which can be used for radar communication. The n here in parenthesis represents the discrete time domain. Alternatively, the nomenclature t could be used to represent the continuous time domain and known in the art. In some implementations, the transmitted waveform may be characterized as a function, in the frequency domain, as F(n) where n here is a given frequency value or bin. (As in common parlance in the art, functions denoted in capital letters denote frequency domain versions of functions, i.e., Fourier transforms). Some common waveforms could include phase-coded waveforms, and stepped-frequency waveforms, for example.

In Step S10, a copy of the transmit waveform $f(n)$ is stored in memory. The copy may be stored in an electronic memory device which a processor accesses. Alternatively or additionally, various values of the transmit waveform $f(n)$ could be stored for values of n in a look-up table or database.

Next, in Step S20, the transmit waveform is further analyzed to see and if it should be converted to an analytic (complex) representation. This is to simplify processing as is generally appreciated in the art. For example, if the signal, $f(n)$ is real (meaning no complex data), then we calculate a corresponding analytic signal, $f_A(n)$. One way to do this is to use a Hilbert transform. Thus, we let $f_A(n)=H\{f(n)\}$, where $H\{f(n)\}$ is the Hilbert transform of $f(n)$. The Hilbert transform is important in signal processing, where it derives the analytic representation, in the complex plane (e.g., In-phase/Quadrature data is in polar form), of an input real signal. In Matlab, the function hilbert( ) returns a complex analytic signal, from a real data sequence. The analytic signal xr+i*xi has a real part, xr, which is the original data, and an imaginary part, xi, which contains the Hilbert transform. By performing a Hilbert transform, we can create the analytic (complex) representation of the received or transmitted signal: $\Sigma_n a_{n,i} e^{-nj(\omega_i t_i + \phi_i)}$ where $j=\sqrt{-1}$. This is a convenient simplification for the purposes of analysis and processing. If both in-phase and quadrature measurements are available, though, then the Hilbert transform is not needed. We assume $f(n)$ is already complex here so no further mention of $f_A(n)$ will be made in the subsequent steps, but it will be appreciated the $f_A(n)$ would be used in lieu of $f(n)$.

In Step S30, a desired target harmonic of interest is determined. In some instances, the desired harmonic may be determined ahead of time, or perhaps by default. In other instances, a radar operator could input a target harmonic. The harmonic is a multiple of the fundamental frequency of the transmit waveform, $n*f_1$, where $n \geq 2$.

Next, in Step S40, an exponential function for the transmit waveform $f(n)$ is generated which corresponds to the desired target harmonic of interest in generated. The exponential function is generally defined as $f^n(n)$. Here, the exponent $n$ will be the same as multiple n of the fundamental frequency of the transmit waveform from Step S30 corresponding to a desired target harmonic of interest. Any analytical function processor $(\bullet)^n$ can be used for generating the exponential function. Matlab provides such a capability. For a second harmonic, the exponential power is 2, and $f^2(n)$ is the squared transmitted function. The square of the transmit waveform, $f^2(n)$ is mathematically defined as $f(n) \times f(n)$. Thus, the matched filter in the case will be configured to look for the frequency of $f^2(n)$ which correspond to the second harmonic response in the received signal. Analogously, for a third harmonic, the exponential power is 3 and $f^3(n)$ is the cubed transmitted function. The cube of the transmit waveform, $f^3(n)$ is mathematically defined as $f(n) \times f(n) \times f(n)$. The matched filter here will be is configured to look for the frequency of $f^3(n)$ which correspond to the third harmonic response in the received signal.

In Step S50, the exponential function of the transmit waveform is applied to the received signal so as to identify and isolated the desired target harmonic. The output of the matched filter is $f_m(n)$ corresponds to a high resolution target signature of the desired harmonic. Using the exponential function at the expected analytic signal of the target signature, it is time-reversed to obtain the matched filter. This time-reversal is necessary so that the filter output becomes the correlation between the received signal and shifted versions of the expected target response. More particularly, the target impulse response of the matched filter has been configured to correlate with the expected target response present in the received signal r(n). The received signal r(n) may be received from the detector 36 of the receiver 30. The target impulse response may include the fundamental and various harmonics of the transmit waveform $f(n)$. But, for non-linear radar application, we are usually interested in harmonics and more particular, in only one particular harmonic.

A convolution function can be used for correlation purposes in some instances. In particular, circular convolution is applicable since periodic functions are at play. For the convolution function, the target impulse response of the matched filter correlates with the expected target response. As discussed above, the exponential function of the transmit waveform $f(n)$ has the same frequency as the n-th harmonic. Thus, if we focus on same frequency, we can limit ourselves to just that harmonic in the received signal r(n). In turns out this correlation can be explained, mathematical, with the matched filter being the time-reversed conjugated version of the expected target response.

FIGS. 6A-I show the convolution processing which may be employed by the matched filter in Step S50 according to embodiments of the invention. These shows examples of some of the intermediate convolution processing steps for ease in explaining the processes. The numerical values depicted in these drawings' examples are arbitrary but would correspond to the signal values. The convolution process may be thought of as multiple "flip," "slide," "multiply," and "add" operations, as further explained below.

The following processing can make use of vector data structure. The vector structure may be a simple one-dimensional array structure of the type used by various computer programming systems for storing data values in memory and processing. The length of the vectors are each N, which can be twice the length of the transmit waveform $f(n)$. Each data field or slot of the vectors is associated with an index location for ease of identifying and processing data in that particular field or slot. The fields or slots in the vectors correspond to small time steps (e.g., 1 ms of less). The indices of the vector are identified below for ease of explanation.

While the vector are illustrated as being horizontal, there is no limitation on their spatial arrangement; these data structures are merely illustrative of exemplary data processing. The vectors could be implemented as memory registers in some implementation. Two similar vectors are primarily used: (i) a received signal vector, (ii) a target impulse response vector. The first vector (i) is populated with sampled signal data of the received signal, r(n). The second vector (ii) is populated with signal data corresponding to the exponential function of the matched filter.

The vectors are initially populated with data. For the received signal vector, in Step 1 (FIG. 6A), signal values corresponding to received signal r(n), are captured over a sampling period in memory. The sampled signal values may correspond to signal values (y-values) indicated on signal amplitude in the time domain; their values in micro- or mill-volts, for instance. In the sensitivity of the detector is known a priori, the voltage values could already correlate to real measurements. The sampling may take place at regular time intervals, such as 1 us or less (perhaps, as small as even 10 ns), to the received signal vector. This timing will likely be dictated by the signal processor used.

For the target impulse response vector, in Step 2 (FIG. 6B), the exponential function $f^n(n)$ of the transmit signal waveform $f(n)$ that was previously stored in memory is retrieved. The target impulse response over a given time period can therefore be anticipated and corresponding target signal values determined. i.e., $f^n$ (n) at the various time intervals corresponding the sampling interval. This step may be consider a "flip," in that the matched filter values were flipped/reversed relative to the "anticipated or "expected" target response.)

Next, in Step 3 (FIG. 6C), any remaining slots in those two vectors are set to zero. For both vectors, if the number of values in the vector in less than the length of the vector, then remaining vector values are simply set to zero. The point here is to "zero-pad" (i.e., add zeros to the end of the time-domain signal) in the vectors such that there is no "wrap-around" when the circular convolution is performed. That is why L is the length of the function (vector) $f(n)$, and N=2L. It may be worth noting, that the target impulse vector response could (typically) be shorter than the measured data "vector." In this case, the length of the zero-padded vectors would be N+L where N is the length of the data sequence and L is the length of the matched filter (sequence).

Figure 6A:
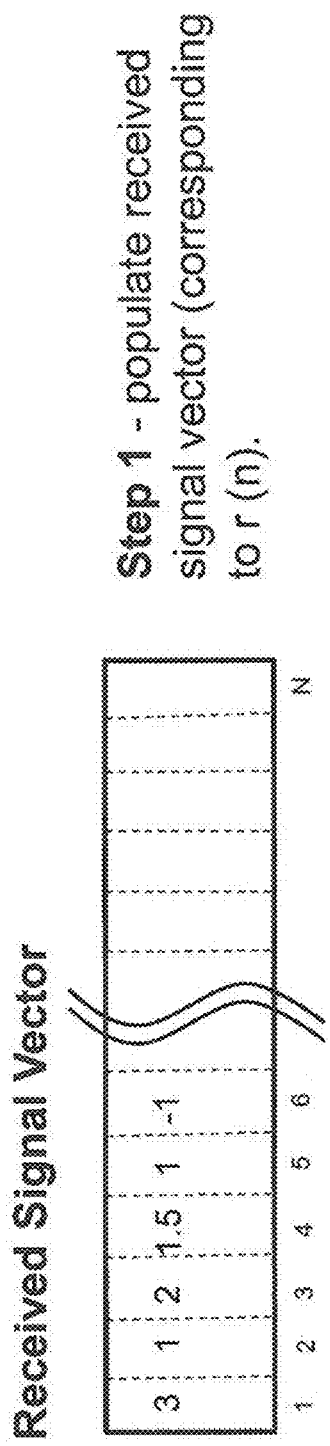
Figure 6B:
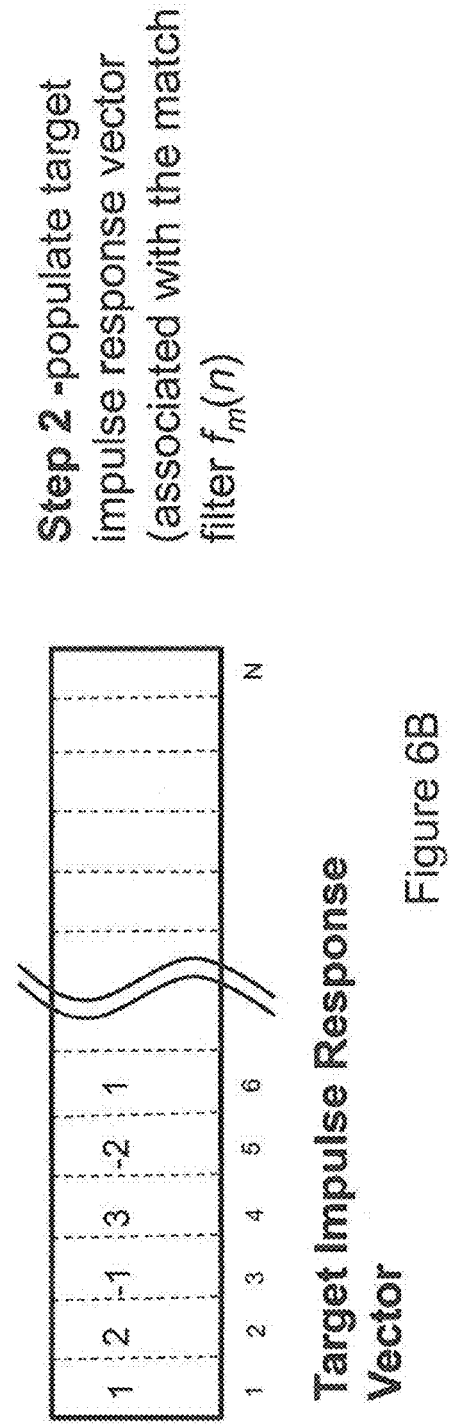
Figure 6D:
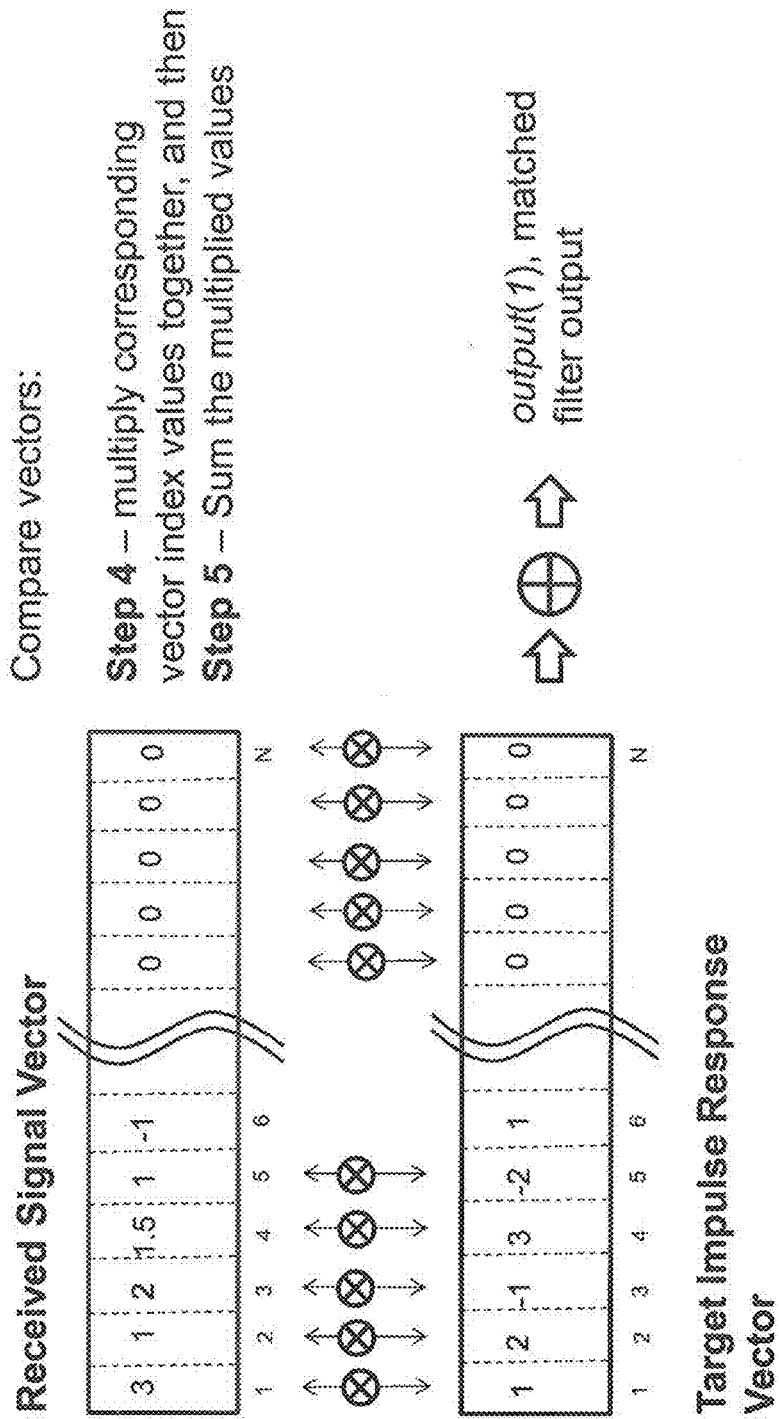

The two vectors are now ready for comparison. The corresponding indices' value of two vectors are multiplied together in Step 4 (FIG. 6D). This operation is indicated as ⊗ in the drawing, and is considered the "multiply" step. The multiplication could be performed sequentially or in parallel. And the multiplied values are then added together in Step 5 (FIG. 6A). This operation is indicated as ⊕ in the drawing, and is considered the "add" step. The sum becomes the matched filter output, output(1); the one here corresponds to the first value. The summed values from each of the iterations of Step 5 may be stored individually or as a vector in memory, as matched filter output Next, in Step 6 (FIG. 6E), we slide all the target impulse vector values one position or step to the right with respect to the received signal vector. The value in the 1-indexed slot moves to the 2-indexed slot, the value in the 2-indexed slot moves to the 3-indexed slot, the value in the 3-indexed slot moves to the 4-indexed slot and so forth. The new positions of the target impulse vector values are depicted in the dark dotted line box. This is considered the "slide" step. As a result of the sliding, the leftmost-position in the 1-indexed slot is now empty and the rightmost-position in the N-indexed slot no longer corresponds to any indexed value in the received signal vector. Thus to maintain continuity of the one dimensional vector in the processing, the rightmost-vector value is wrapped-around to the leftmost 1-indexed slot in the target impulse response vector. Alternatively, a circular data structure might be used which would not require this wrap-around step.

Steps 4-6 are repeated in Step 7 (FIG. 6F), as necessary, until the target impulse vector values have been shifted through all the index positions of that vector and compared with all of the received signal vector values. That is, the shifted target impulse vector values are multiplied with the corresponding received signal vector (in Step 4), the multiplied valued summed together (in Step 5), and the target impulse vector values shifted to the right another position (in Step 6). If there is a non-linear target present, then the correlation should peak at some position. The peak represents a high-degree of correlation. These steps continue until the target impulse vector resumes its configuration at the end of Step 3. The summed values from each of the iterations of Step 5 may be stored individually or as a vector in memory, as matched filter output, output( ).

Figure 6G:
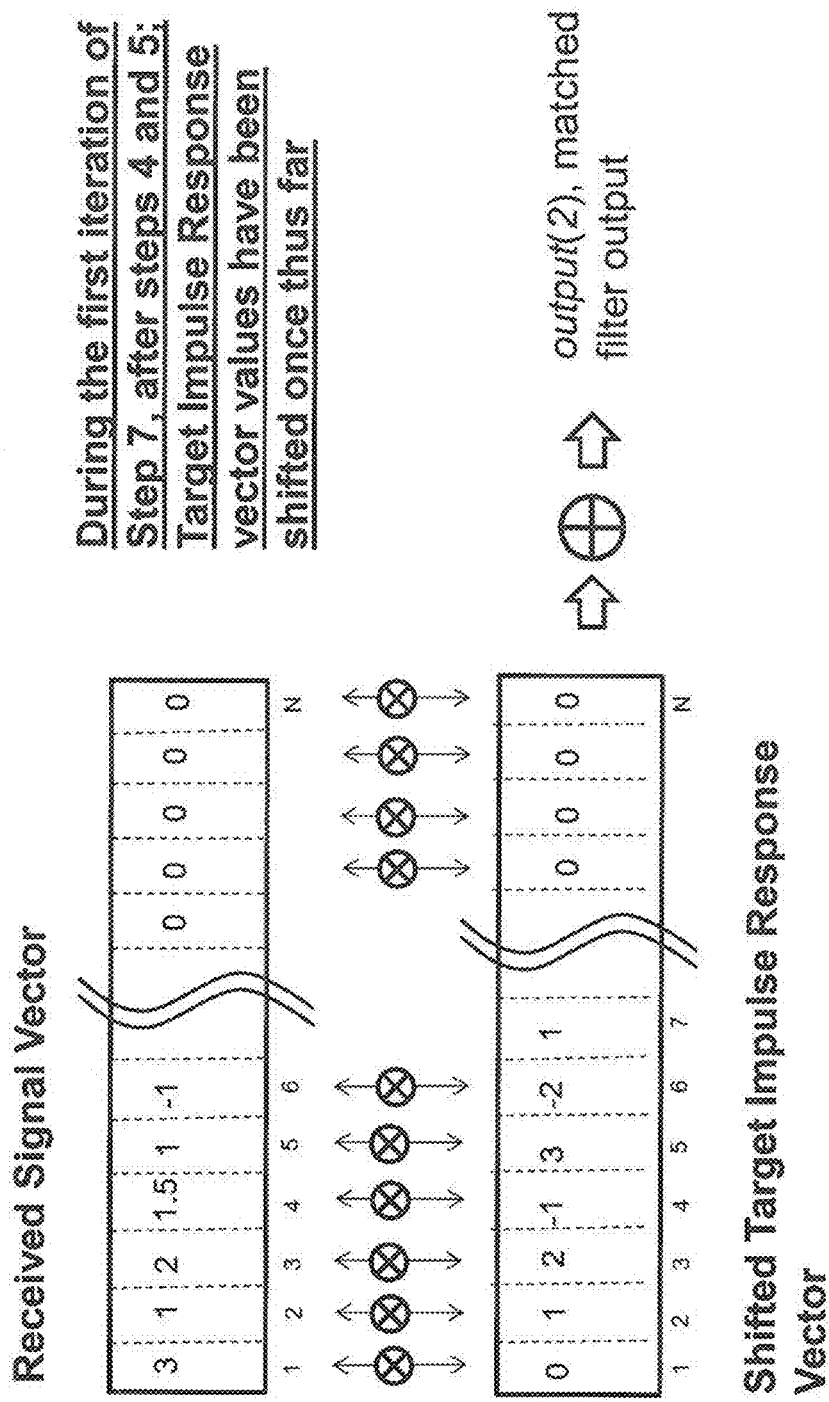
Figure 6H:
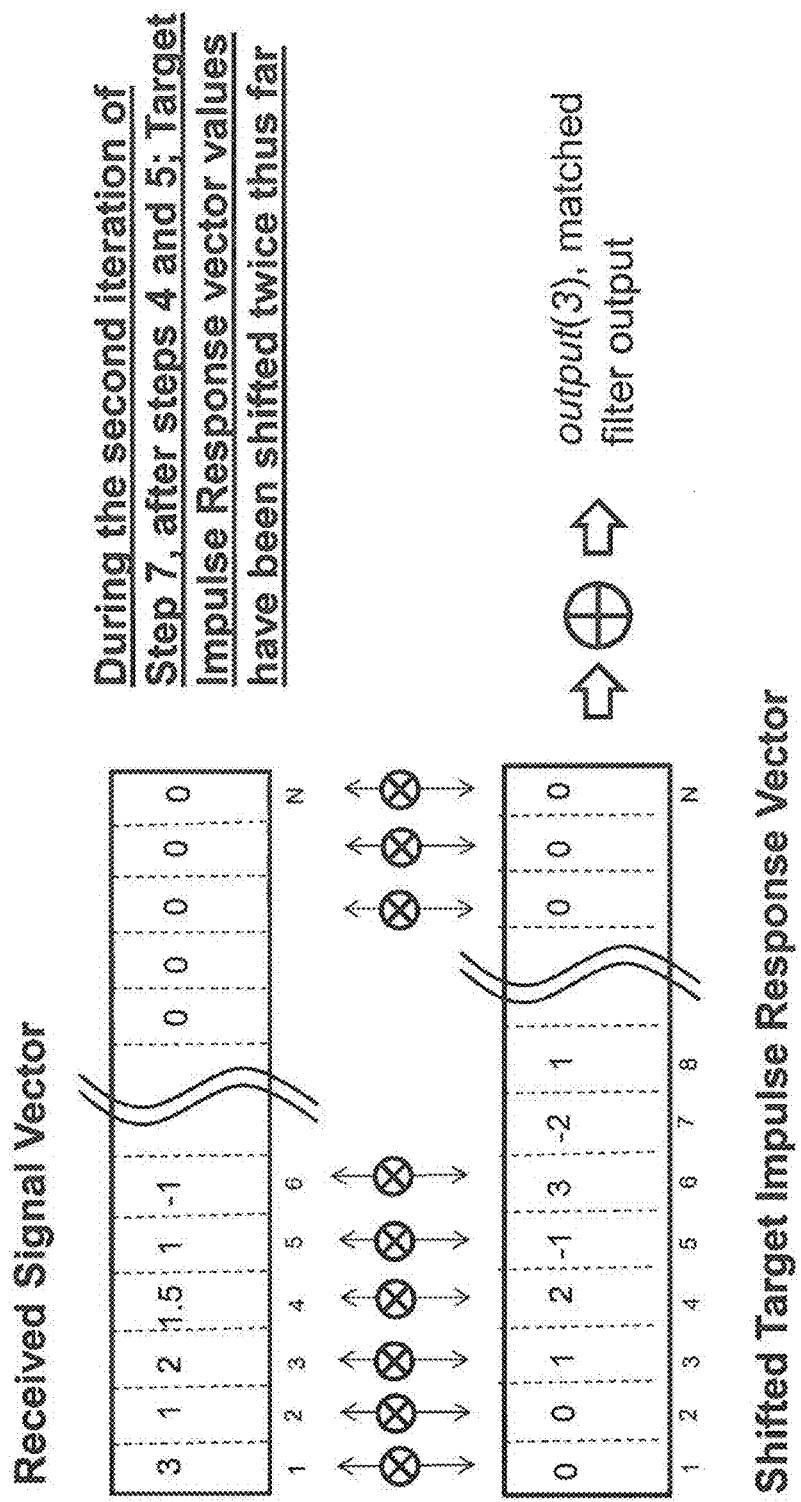
Figure 6I:
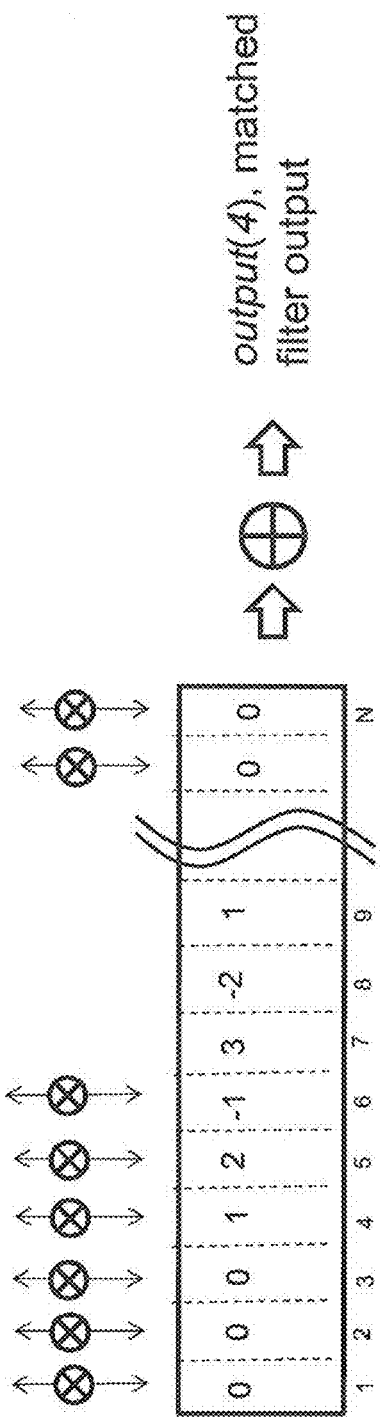

In Step 8 (FIG. 6F), the maximum matched filter output, output( ) value is identified from among the values previously determined for all the iterations. This value points to the relative shift between the target impulse vector and the received vector that produces the best match. Put another way, this is the time delay or phase shift between the two signals where they are in phase. This step presupposes that the desired harmonic corresponding to the target impulse vector is necessarily present in the received signal according to a non-linear radar technique. If one were to use the linear response and linear matched filter (i.e., the matched filter for n=1), instead, then there would be many reflections from naturally occurring clutter that could produce false alarms. It is hoped that such false alarms are eliminated or at least greatly reduced by using the non-linear response. But, if for some reason, a (nearly) exact replica of the expected target return that is not from the target, is encountered then this step could generate a false positive also. FIGS. 6G-I show additional iterations of Step 7, after Steps 4 and 5 (but before the next shifting in Step 6) for matched filter outputs, outputs(2), output (3) and output(4).

The processing can be repeated all over again for new vectors values in Step 9 (FIG. 6F) by returning to Step 1. A new received vector will be generated for each sampling measurement of the received signal, r(n). It is noted that a "new" received vector may be created by each iteration of the recursive sidelobe minimization (RSM) technique as further discussed below with respect to sidelobe reduction processing embodiments. The target impulse response vector values would stay unchanged so long as using the same transmit waveform $f(n)$.

The aforementioned convolution process can be executed using Matlab code using complex conjugate operations, for instance. The time reversal and complex conjugate operations are performed so that the filtering operation (i.e. convolution process) becomes a correlation between the exponential of the transmit signal, and the expected target response (i.e., harmonic signal).

Consider an example of isolating a desired second harmonic using a matched filter for a second power exponential function of transmit waveform function, for instance. For the second harmonic, the exponential power is 2. If $f(n)$ is the transmitted waveform, then $f^2(n)$ is the squared transmitted function. The square of the transmit waveform, $f^2(n)$, is mathematically defined as $f(n) \times f(n)$. The matched filter would thus be configured to look for the frequency of $f^2(n)$ which correspond to the second order (non-linear) harmonic response in the received signal. The matched filter for the square of the transmit waveform function may be created as follows: $f_m(n) = m(n)^*$, where $m(n)=f^2(N-n)$, $f(n)$ is the transmitted waveform, $m(n)^*$ is the complex conjugate of $m(n)$, $N=2L$, L is the length of $f(n)$, and the additional L time domain samples (not occupied by $f$ $f^2(n)$, $n \leq L$) are equal to zero. The idea here is to zero-pad (i.e., add zeros to the end of the time-domain signal) in such a way that there is no "wrap-around" when the circular convolution is performed. That is why L is the length of the function (vector) f(n), and N=2L.

The processing should also be able to handle a situation in which multiple frequency tones are all transmitted simultaneously and in which they all must be added together thereby resulting in production of cross terms. The multi-tone, analytic (complex) signal would be represented as a sum of complex exponentials at the various frequencies. Hence, the product of $e^{jat} * e^{jbt}$ would yield $e^{j(a+b)t}$ (where and b are two different frequencies). The matched filtering would correspond to selection of the frequency bins corresponding to the desired intermodulation products.

In addition, the process can handle multiple frequency tones transmitted sequentially, such as in a chirp function or other function. In this case, since only one frequency will be transmitted at a time, then there would be no cross-terms present. That is, if $B_i$ is frequency band i, and $f_i$ is center frequency i, then $f_2 = nf_1$, and $B_2 = nB_1$. (For a second harmonic, $f_2 = 2f_1$, and $B_2 = 2B_1$. It is noted that this is a reasonable approximation to the case where the non-linearity can be represented by a quadratic (i.e. squaring the transmitted waveform). We then look at the squared terms in the non-linear target response. These correspond to frequency-multiplied terms (in the frequency domain).

In addition, the process can handle other commonly encountered radar waveforms as transmit waveforms including, but not limited to: pseudorandom noise waveforms, polyphase code waveforms such as Frank codes of varying length, Barker codes of varying lengths, P1 codes, P2 codes, and pseudorandom codes of various lengths.

Figure 7:
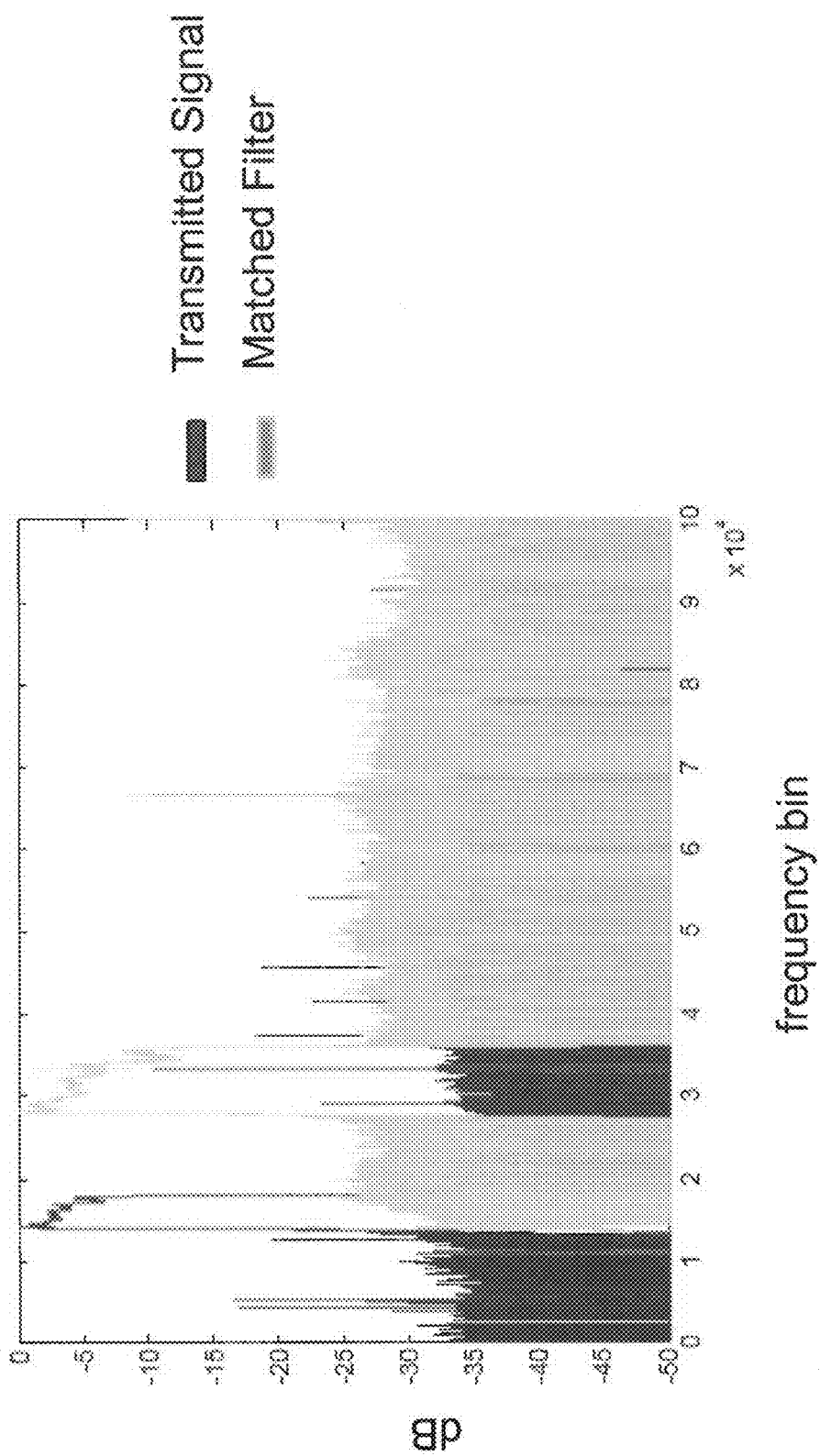
FIG. 7 shows an example of the frequency domain representation of the transmit chirp waveform together with the frequency domain representation of the matched filter.

FIG. 7 shows an example of the frequency domain representation of the transmit chirp waveform $f(n)$, together with the frequency domain representation of the matched filter $f_m(n)$. The frequency bins represent small ranges of frequency. The frequency bin sizes might correspond to the frequency step size of the transmitted chirp waveform. A chirp waveform is a sinusoidal wave that increases in frequency (typically, linearly or exponentially) over time. For example, bin sizes on the order of 10 kHz to 1 MHz might be used. The "black" region corresponds to the transmit signal. It extends (approximately) from bins number 15,000 to 18,000. The actual signal occupies only a small percentage of the total number of frequency bins. It peaks at just above about −5 dB. The other isolated "spikes" are actually artifacts. The "grey" region corresponds to the time-reversed matched filter which corresponds to the square of the transmitted waveform. It extends (approximately) from bins number 30,000 to 36,000. The matched filter also peaks just above about −5 dB. In this case, for an intended $2^{nd}$ harmonic in the non-linear radar system, the matched signal is the square of the transmit signal, which is double of the frequency range of the transmit signal.

In further embodiments, the matched filtering may be used in conjunction with sidelobe-reduction techniques. A recursive sidelobe minimization (RSM) technique is one of said techniques which may be used.

Figure 8:
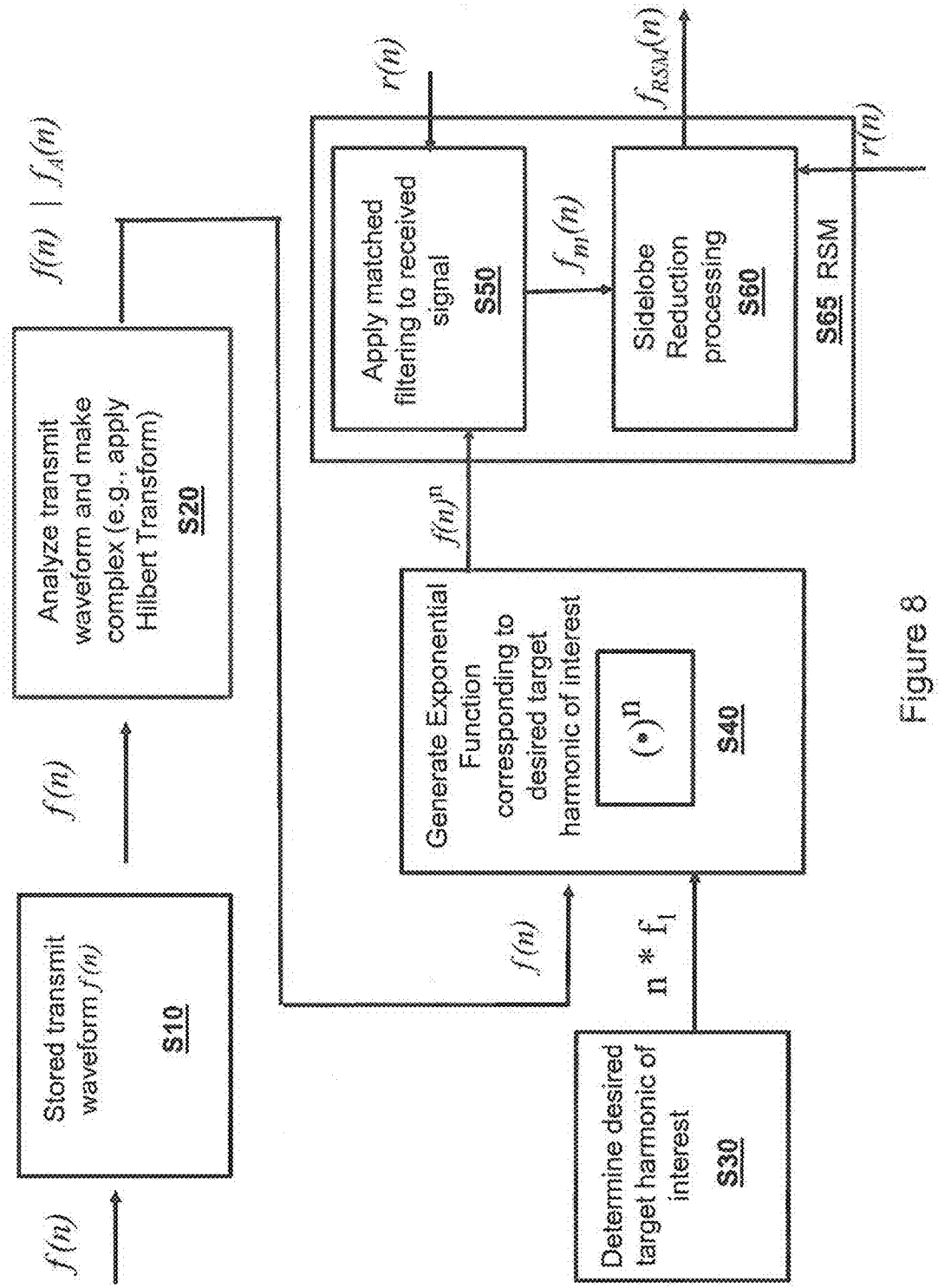
FIG. 8 shows a flow chart diagramming the matched filter processing along with sidelobe reduction used by the matched filter in a non-linear radar system or other applications in accordance with embodiments of the present invention.

FIG. 8 shows a flow chart diagramming the matched filter processing along with sidelobe reduction used by the matched filter 40 in a non-linear radar system 10 or other applications in accordance with embodiments of the invention. FIG. 5, previously described above, detailed the overall processing with respect to matched filter processing in including Step S10-S50 which are largely the same here and thus will not be described again here. The processing further includes Step S60 which applies sidelobe processing technique for non-linear radar targeting. The application of the matched filter of Step S50 and the sidelobe reduction processing Step 60 may be (substantially) performed together. Hence, they are shown in the drawing as being grouped together in Step S65.

FIGS. 9A-E show a recursive sidelobe minimization (RSM) for the sidelobe reduction that is used in conjunction with the matched filter as may be employed in Step S65 according to embodiments of the invention.

In this processing, $f_{RSM}(n)$ denotes the function for the final high range resolution (HRR) signature produced by the iterative RSM processing. Since the RSM processing saves the minimum value for each HRR cell over all iterations, it must be first initialized. Because there will be many iterations, an arbitrary very high number may be used. Thus, in Step 1, the values of $f_{RSM}(n)$ are initially set to an very high number, such as $10^{30}$, for all n. The initial values obtained for each of the HRR cell will be saved.

Next, in Step 2, the variables needed for iterative sidelode reduction are set. These include: R, the number of cells to randomly excise during recursive sidelobe minimization; P, the number of recursive sidelobe minimization iterations (it is essentially an iteration limit); and B, the band of frequencies considered for matched filtering. According to some embodiments, P may be in the vicinity of 30-50 (based on our past experience), R may be somewhere around 30% of the total number of cells (i.e., the total number of frequency bins), and B can be the frequencies around the particular harmonic of interest (the bins noted earlier). If too many samples are excised, then there may be a risk of missing a strong target return. In this case, B might be selected to correspond to a wavelength (frequency) that is well-matched to the target dimensions/size.

Some processing is preferably performed in the frequency domain, instead of the time domain, which is made much simpler in terms of processing. It is noted that this same processing could be done in the time domain by storing a sequence of "filtered" match filters corresponding to the response obtained when a particular set of frequency bins has been removed. This would require saving a large number of coefficients, since a separate filter would be required for each set of randomly excised frequency bins.

Thus, in Step 3, the measured received signal, r(n), and the matched filter, $f_m(n)$, are both transformed into the frequency domain. This can be performed using a well-known Fourier transform. The transformed signals are then denoted as R(m) and $F_m(m)$, respectively. (As mentioned above, functions denoted in capital letters are often used for frequency domain versions of functions, i.e., Fourier transforms).

Sidelobe reduction is an iterative process. Thus, it will be repeated a number of times; previously P was define in the earlier step. This looping actually represents the RSM processing used. Each time through the loop, different samples are excised. This causes the sidelobe levels within the hrr signature to change while the target levels remain about the same. Hence, by keeping saving the minimum value over all iterations you end up with a target level that is about the same while the sidelobe/noise levels are reduced.

RSM is now ready to begin. The recursive or iterative steps are in collectively performed in Step 4. Variable P, the iteration limit, denotes the number of times these steps are repeated.

It is important to get different/diverse sets of excised samples so that the sidelobe patterns can change significantly from iteration to iteration. So a random sampling is taken each iteration. In step, Step 5, R frequencies samples are randomly excised from within frequency band B. There are functions in Matlab, rand( ) and randperm( ) for randomly selecting numbers within a given range of values. The random number generator can be used to select the samples (index numbers) that are to be excised (set to zero).

Figure 9C:
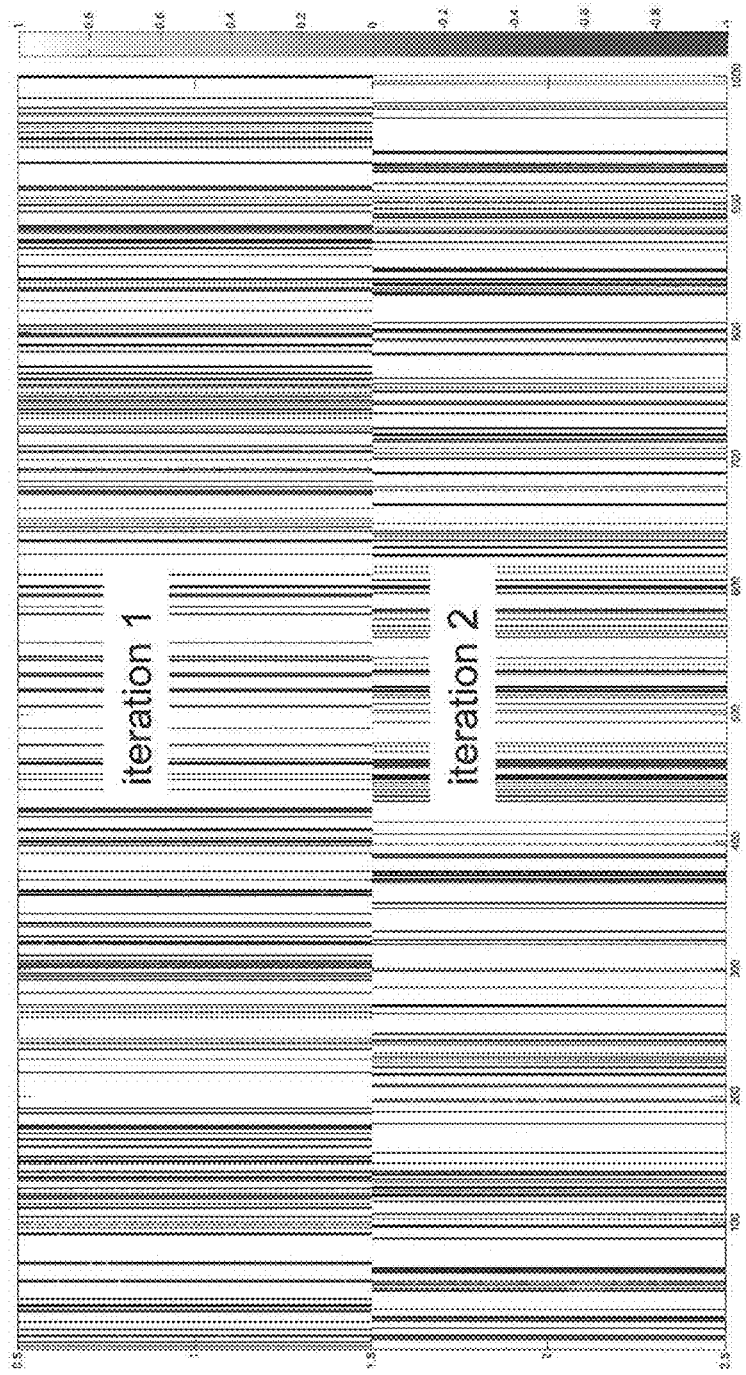

The presence of zero values in the frequency domain representation of a filtered signal induces a particular sidelobe pattern in its time domain representation. This corresponds to its HRR profile. $F_{out}(m)$ will denote the frequency-domain representation of the HRR profile $f_{RSM}(n)$ produced by each iteration of the RSM processing. Thus, $F_{out}(m)$ will be zero in the randomly selected bins described above. FIG. 9C shows an example of two randomly selected sets of indices for excision in Step 5 for a vector of length 1000. The black vertical lines indicate two different, randomly selected sets of indices. The white vertical areas indicate indices that have been retained. In this example, approximately 20% of the indices have been randomly excised.

In Step 6, sidelobe reduction is applied to $F_{out}(m)$. Sidelobe reduction may be thought of as being a smoothing process of sorts. In this case, a windowing operation can be used in the processing here for reducing sidelobe levels (at the expense of an increased mainlobe width). In general, it includes multiplying the function by another function that is tapered at the ends (like a bell-shaped curve). The idea is to avoid abrupt transitions (to zero) at the ends of the data sequence. Example windowing functions W(m) can include the Matlab functions: hanning( ) for a Hanning window, taylorwin( ) for a Taylor window, and rectwin( ) for a rectangular window.

Apply frequency windowing and calculate $F_{out}(m)=W(m) R(m) F_m(m)$, where W(m) is a suitable weighting window function. $R(m)*F_m(m)$ in this calculation is actually the matched filtering convolution calculated in the Frequency domain.

Figure 9D:
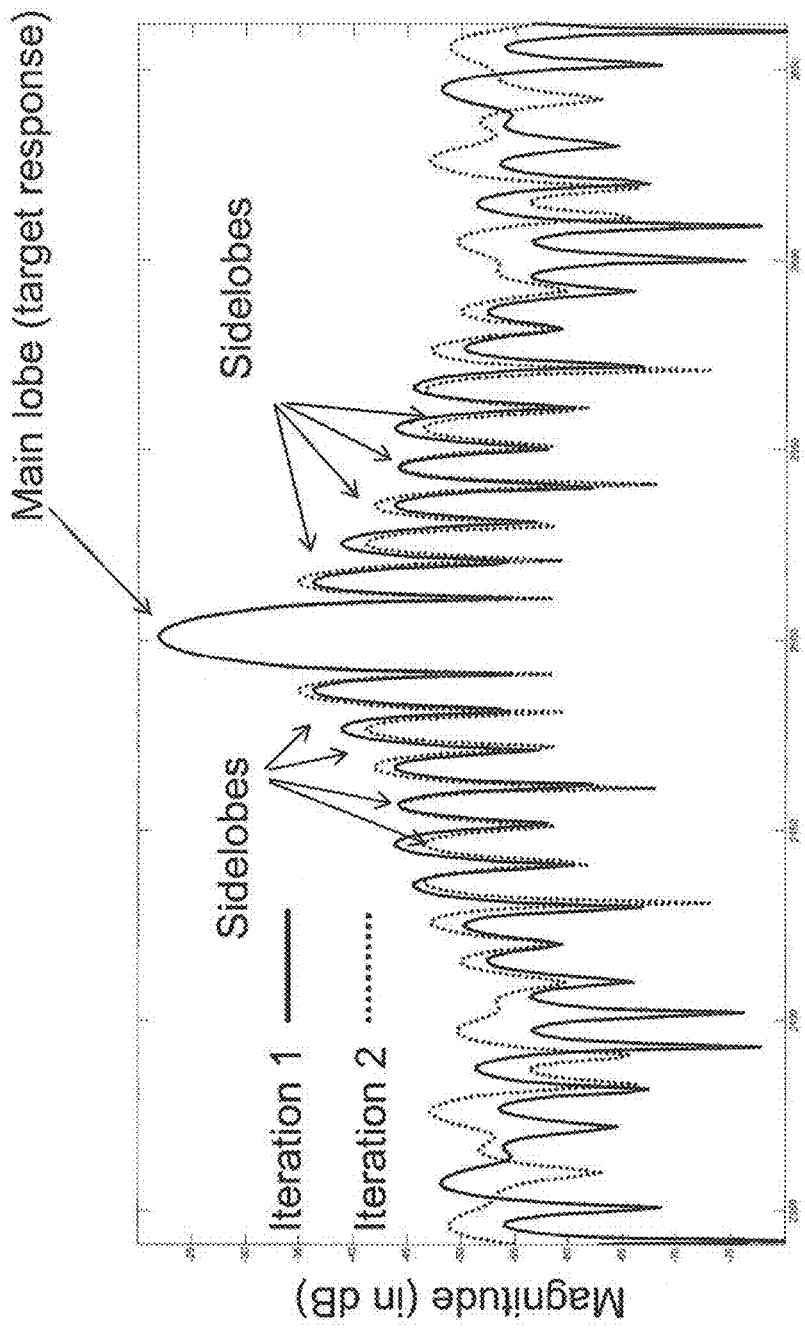

Ranging distances are computed from the previously-formed $F_{out}(m)$ in Step 7. Intensities for various ranging distances are represented here as the complex magnitude of $f_{out}(n)$, $|f_{out}(n)|$. As previously stated, $F_{out}(m)$ is in the frequency domain. Thus, to covert the frequency domain to the ranging domain, a well-known inverse fast Fourier transform (IFFT) may be used here. Matlab provides function: IFFT (X), which returns the inverse discrete Fourier transform of vector X, computed with a fast Fourier transform (FFT) algorithm. So $f_{out}(n)=IFFT(F_{out}(m))$. FIG. 9D shows the resulting sidelobe patterns for the two selected sets of iterations. The mainlobe is shown as a large peak corresponding to the target signature. The sidelobes are also apparent which are the lobes (local maxima) of the point-target response that are not the main lobe.

Figure 9E:
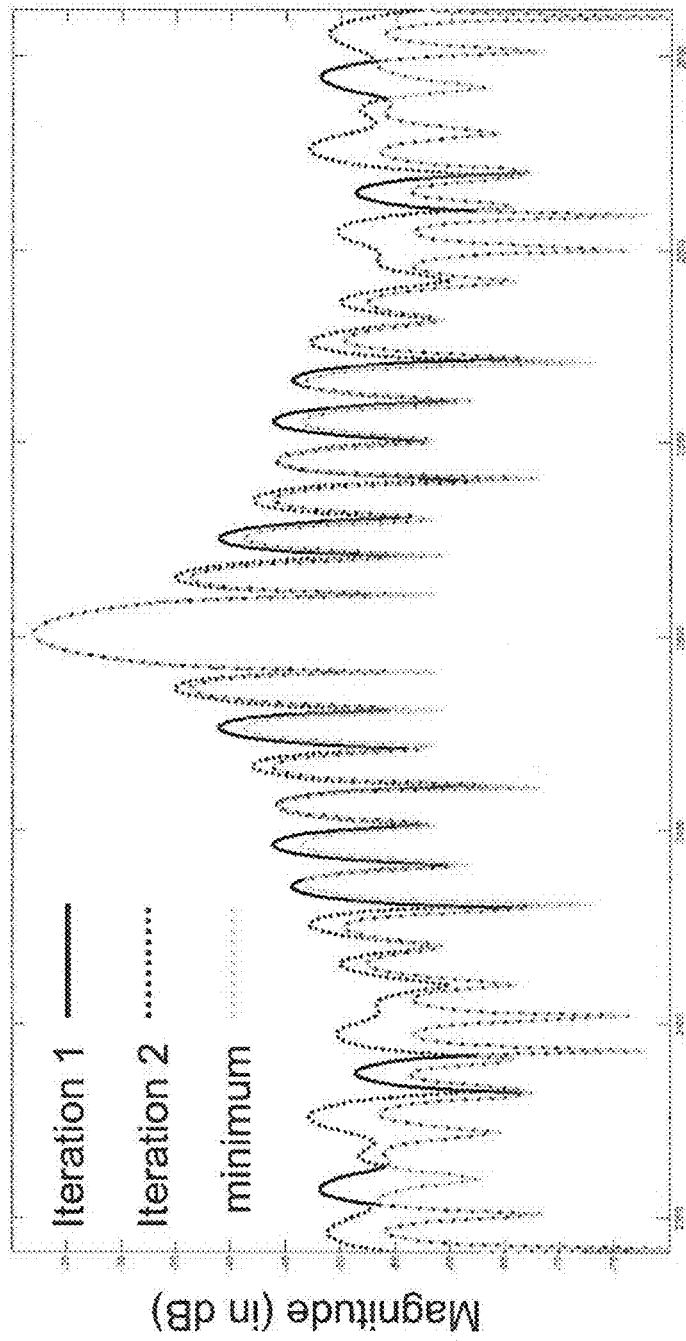

The RSM processing saves the minimum value for each HRR cell across all iterations. As such, the previously stored $f_{RSM}(n)$ value and current value of $f_{out}(n)$ for this iteration are compared for each cell and the smaller selected in Step 8. For every n, $f_{RSM}(n)=\min(f_{RSM}(n), |f_{out}(n)|)$. Put simply, this means that we take the smallest of the-saved-output magnitude from the matched filter and current output magnitude of the matched filter, recalling that the saved output magnitude represents the minimum value across all previous iterations. FIG. 9E shows an example of minimum of the two patterns; it is the pattern shown in gray. The minimum pattern would be stored, a new set of random indices would be selected, and the process is repeated with each iteration of Step 4.

The final result of the processing, in Step 9, is that the high resolution range profile (with reduced sidelobe levels), $f_{RSM}(n)$ as output by the system. $f_{RSM}(n)$ is real.

Figure 10A:
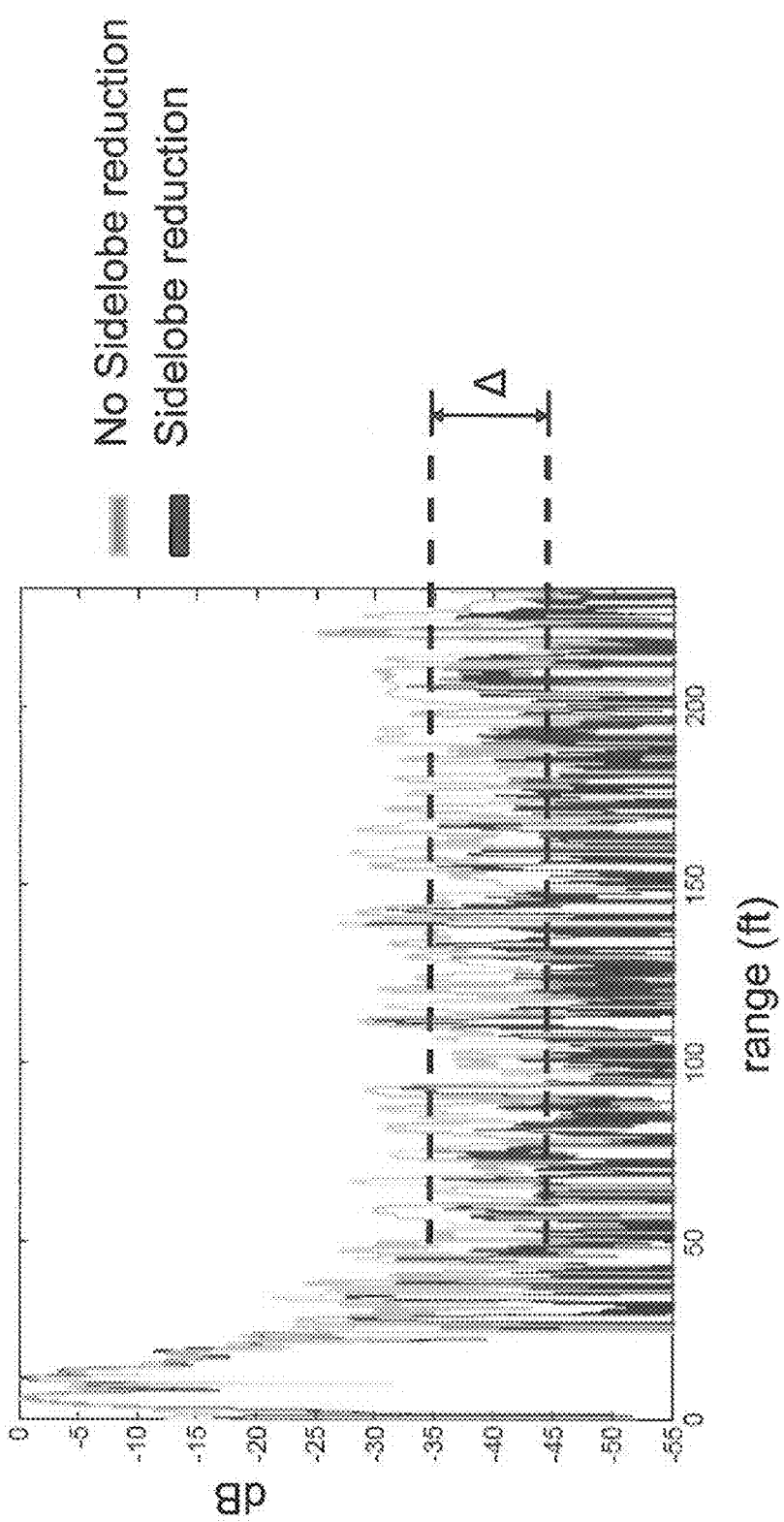
FIGS. 10A and 10B show an example of a high resolution range (HRR) profile according to embodiments of the present invention.
Figure 10B:
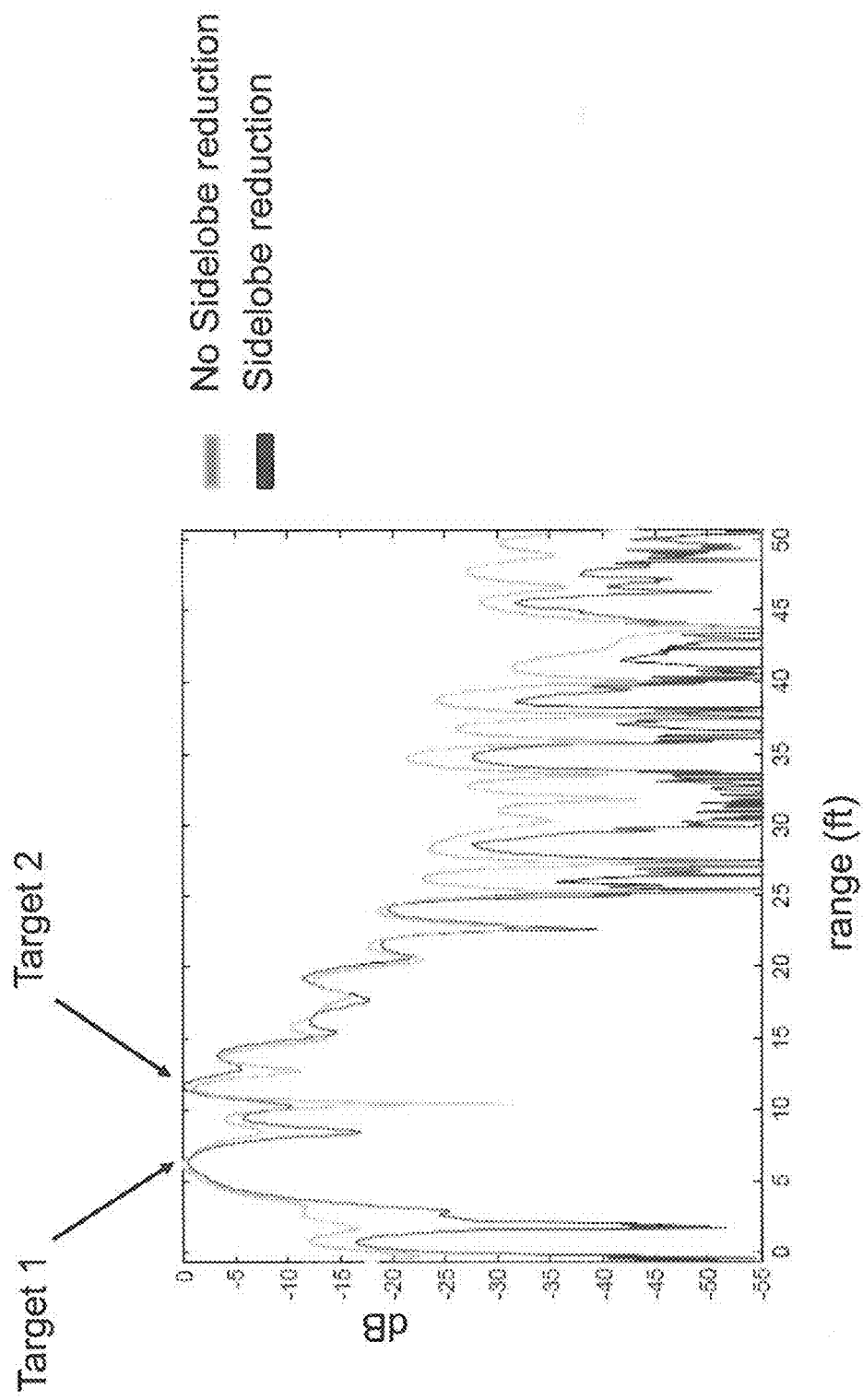

For the aforementioned embodiment, RSM has been integrated directly into the high resolution range (HRR) profile generator. This modified processing improves the localization capabilities of the resulting system. In addition, the suppression of sidelobe artifacts also makes target detection more reliable by enhancing the contrast between target and non-target elements of the HRR profile. This is illustrated in FIG. 10A which shows the target signature enhancement realized by incorporation of RSM into the HRR profile calculation. FIG. 10B show the target response for ranges between 0 to 50 feet, in greater detail. In these drawings, "grey" corresponds to no sidelobe reduction, and "black" correspond to sidelobe reduction. The targets here were small electronic devices.

In FIG. 10A, delta Δ indicates the amount of sidelobe reduction obtained through the incorporation of RSM (in dB). In this particular case, it is about 10 dB. These plots illustrate how the two targets (one at 6 ft and one at 12 ft) are both distinguishable and detectable. In addition, a target detection algorithm exploiting local contrast would have a much easier time detecting the targets after non-linear sidelobe reduction has been applied.

The novel methodology eliminates natural clutter by processing non-linear responses. Many of the potential false alarms plaguing modern radar systems can be discarded in the earliest processing stages. That is, natural clutter responses would be virtually eliminated from the processed radar data sets. Natural clutter is responsible for many false alarms. Many radar, target detection algorithms employ multiple stages. So, the false alarms attributable to natural clutter would be eliminated by the earliest algorithms, e.g., a prescreener of some sort. In addition, the system exploits an adaptive, matched filtering formulation combined with a recursive sidelobe minimization strategy. This processing paradigm enables both localization of the target and enhancement of the local target-to-background ratio. These, in turn, serve to increase target detectability.

The system processing increases target-to-clutter ratios by exploiting the non-linear characteristics of specific target responses to a suitable radar probe signal. Qualitatively, the methodology is straightforward: natural clutter does not produce a non-linear response; hence, there would be (in theory) an infinite target-to-clutter ratio for non-linear targets. It also leverages radar processing techniques previously configured for use with linear systems. These techniques provide additional contrast between the target response and responses due to background clutter and artifacts (e.g. sidelobes). Existing linear systems are, by their very nature, unable to exploit the non-linear target responses. Hence, they cannot realize the increases in target-to-clutter ratio achievable in the non-linear system.

The novel methodology may be used with any application requiring location of electronic devices within an area under surveillance. This could include an initial scan of the area to ensure no devices are present. It could also include stand-off interrogation of people/materiel entering a restricted area. Of course, the target of interest could include isolated areas in which the presence of electronics could indicate danger.

It is noted that aspects relating to this invention have been previously disclosed in:

(i) Gallagher, K. A.; Mazzaro, G. J.; Ranney, K. I; Nguyen, L. H; Martone, A. F.; Sherbondy, K. D.; and Ram M. Narayanan, R. M., "Nonlinear synthetic aperture radar imaging using a harmonic radar," *Proc. SPIE* 9461, Radar Sensor Technology XIX; and Active and Passive Signatures VI, 946109 (May 21, 2015); doi:10.1117/12.2177219, publishing the conference proceedings of Apr. 20, 2015; and (ii) Gallagher, K. A.; Narayanan, R. M.; Mazzaro, G. J.; Ranney, K. I.; Martone, A. F.; and Sherbondy, K. D., "Moving target indication with non-linear radar," presented at the Radar Conference (RadarCon), 2015 IEEE, of 10-15 May 2015, the disclosures of which are herein incorporated by reference in their entities.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow. All references cited above are hereby incorporated by reference herein for all purposes.

We claim:

1. A method of non-linear radar target location comprising:
    transmitting, with an transmitting antenna, a signal of a transmit waveform towards a target;
    receiving, with a receiving antenna, a signal from the target; and
    by at least one processor:
        creating a matched filter by generating an exponential function of the transmit waveform corresponding to a particular harmonic of the interest; and
        applying the matched filter to the received signal to generate and output a signature waveform for the target of the particular harmonic of interest.

2. The method of claim 1, before the step of creating the matched filter, further comprising by the at least one processor:
    analyzing the transform waveform to determine if it is real or complex; and
    calculating an analytic signal version of the transmit waveform for subsequent use as the transmit waveform, if the transmit waveform is determined to be real.

3. The method of claim 2, wherein calculating the analytic signal version of the transmit waveform comprises applying a Hilbert transform to the transmit waveform.

4. The method of claim 1, wherein the particular harmonic of the interest is characterized as $n*f_1$, where $n \geq 2$ and $f_1$ is the fundamental frequency of the transmit waveform and the exponential function is defined as $f^n$ (n).

5. The method of claim 1, wherein the harmonic of interest is a second harmonic and the exponential function is the square of the transmit waveform.

6. The method of claim 1, wherein the harmonic of interest is a third harmonic and the exponential function is the cube of the transmit waveform.

7. The method of claim 1, wherein the exponential function is assumed to be an expected target response signature such that the output of the matched filter is a correlation between the received signal and the expected target response signature.

8. The method of claim 1, wherein applying the matched filter to the received signal comprises:
    sampling the received signal over a period of time;
    time-reversing the exponential function generally corresponding to the same period of time; and
    comparing the sampled received signal and time-reversed the exponential function via a convolution process to determine the time delay or phase shift between the two signals.

9. The method of claim 8, wherein the convolution process comprises:
    populating a received signal vector with sampled signal data of the received signal, and a target impulse response vector with signal data corresponding to the exponential function.

10. The method of claim 9, further comprising:
    adding zero values to any unpopulated data fields in the received signal and the target impulse response vectors.

11. The method of claim 10, wherein the convolution process is an iterative process, in which each iteration comprises:
    multiplying corresponding vector index values of the received signal and the target impulse response vectors together;
    summing the multiplied values;
    shifting the target impulse vector values one index position to the right; and
    wrapping rightmost shifted-position value to the leftmost-position in the vector; and
    after completing all iterations, identifying the maximum summed value for all the iterations.

12. The method of claim 11, wherein a new received vector is generated for a new sampling of the received signal, and the target impulse response vector values stay unchanged so long as the same transmit waveform is used.

13. The method of claim 1, further comprising by the at least one processor:
    applying sidelobe reduction in combination with the matched filtering.

14. The method of claim 13, wherein the combined sidelobe reduction and matched filtering comprises:
    filtering the received signal with the matched filter; and
    performing a recursive sidelobe minimization process (RSM) in a plurality of iterations, wherein each iteration of the RSM process comprises:
        randomly excising a sub-set of frequency samples from within a frequency band of the matched filtered received signal; and
        reducing sidelobe levels of said signal by a windowing operation.

15. The method of claim 14, wherein the received signal and the matched filter are both transformed into the frequency domain prior to the filtering operation.

16. The method of claim 14, wherein the windowing operation comprises a Hanning window, a Taylor window, or a rectangular window.

17. The method of claim 1, wherein the transmit waveform comprises a chirp waveform, pseudorandom noise waveform, polyphase code waveform, Frank code waveform, Barker code waveform, or peudorandom code waveform.

18. A system for non-linear radar target location comprising:
- a transmitter having an antenna which is configured to transmit a signal of a transmit waveform towards a target;
- a receiver having an antenna which is configured to receive a signal from the target; and
- at least one processor which is configured to:
  - create a matched filter by generating an exponential function of the transmit waveform corresponding to a particular harmonic of the interest; and
  - apply the matched filter to the received signal to generate and output a signature waveform for the target of the particular harmonic of interest.

19. The system of claim 18, wherein the transmitter further comprises a wave generator configured to generate to the transmit waveform.

20. A method of non-linear radar target location comprising:
- transmitting, with an transmitting antenna, a signal of a transmit waveform towards a target;
- receiving, with a receiving antenna, a signal from the target; and
- by at least one processor:
  - analyzing the transform waveform to determine if it is real or complex; and
  - calculating an analytic signal version of the transmit waveform for subsequent use as the transmit waveform, if the transmit waveform is determined to be real;
  - creating a matched filter by generating an exponential function of the transmit waveform corresponding to a particular harmonic of the interest;
  - filtering the received signal with the matched filter signal;
  - performing a recursive sidelobe minimization process (RSM) in a plurality of iterations, wherein each iteration of the RSM process comprises:
    - randomly excising a sub-set of frequency samples from within a frequency band of the matched filtered received signal; and
    - reducing sidelobe levels of the matched filtered received signal by a windowing operation.

* * * * *